US011485413B2

(12) United States Patent
Niewiadomski et al.

(10) Patent No.: US 11,485,413 B2
(45) Date of Patent: Nov. 1, 2022

(54) APPLICATION OF AUXILIARY LIGHTING IN AUTOMATIC HITCH OPERATION

(71) Applicant: Ford Global Technologies, LLC, Dearborn, MI (US)

(72) Inventors: Luke Niewiadomski, Dearborn, MI (US); Douglas Rogan, Ferndale, MI (US); Shannon Brooks-Lehnert, Ann Arbor, MI (US); Chen Zhang, South Rockwood, MI (US); Roger Arnold Trombley, Ann Arbor, MI (US); Peter Ling, Canton, MI (US); Kenneth Michael Mayer, Ypsilanti, MI (US); Seyed Armin Raeis Hosseiny, Canton, MI (US); Bo Bao, Canton, MI (US); Steven Wayne Friedlander, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 201 days.

(21) Appl. No.: 16/174,942

(22) Filed: Oct. 30, 2018

(65) Prior Publication Data

US 2020/0130744 A1    Apr. 30, 2020

(51) Int. Cl.
| | | |
|---|---|---|
| *B62D 15/02* | (2006.01) | |
| *G03B 15/02* | (2021.01) | |
| *B60D 1/36* | (2006.01) | |
| *B60R 1/00* | (2022.01) | |
| *B60Q 1/22* | (2006.01) | |
| *G06V 20/20* | (2022.01) | |
| *G06V 20/56* | (2022.01) | |

(52) U.S. Cl.
CPC ............. *B62D 15/025* (2013.01); *B60D 1/36* (2013.01); *B60Q 1/22* (2013.01); *B60R 1/00* (2013.01); *G03B 15/02* (2013.01); *G06V 20/20* (2022.01); *G06V 20/56* (2022.01); *B60R 2300/808* (2013.01)

(58) Field of Classification Search
CPC .... B62D 1/28; B62D 15/025; B62D 15/0275; B62D 15/028; B62D 15/029; B62D 15/024; B60D 1/36; B60D 1/363; B60Q 1/22; B60R 1/003; B60R 2300/808; G06K 9/00791
See application file for complete search history.

(56) References Cited

U.S. PATENT DOCUMENTS

| | | | |
|---|---|---|---|
| 5,901,426 A | 5/1999 | Okazaki et al. | |
| 6,900,724 B2 | 5/2005 | Johnson | |
| 9,346,396 B2 | 5/2016 | Nave et al. | |

(Continued)

FOREIGN PATENT DOCUMENTS

| | | |
|---|---|---|
| DE | 102012001380 A1 | 8/2012 |
| EP | 2682329 A1 | 1/2014 |

*Primary Examiner* — Ig T An
(74) *Attorney, Agent, or Firm* — Gregory P. Brown; Price Heneveld LLP

(57) ABSTRACT

A vehicle hitching assistance system includes a controller acquiring image data from the vehicle and identifying a trailer within a specified area of the image data and then identifying a coupler of the trailer. The specified area is less than a total field of the image data. The controller then outputs a steering signal to the vehicle to cause the vehicle to steer to align a hitch ball of the vehicle with the coupler.

19 Claims, 18 Drawing Sheets

(56) References Cited

U.S. PATENT DOCUMENTS

| | | |
|---|---|---|
| 9,464,886 B2 | 10/2016 | Salter et al. |
| 9,696,723 B2 | 7/2017 | Zeng et al. |
| 2005/0074143 A1 | 4/2005 | Kawai |
| 2014/0218506 A1* | 8/2014 | Trombley ............... B62D 13/06 348/113 |
| 2014/0267688 A1 | 9/2014 | Aich et al. |
| 2015/0115571 A1 | 4/2015 | Zhang et al. |
| 2016/0023601 A1* | 1/2016 | Windeler ........... B62D 15/0275 348/118 |
| 2016/0052548 A1* | 2/2016 | Singh .................. B62D 15/028 701/41 |
| 2020/0369320 A1* | 11/2020 | Niewiadomski ...... B60W 10/20 |

* cited by examiner

APPLICATION OF AUXILIARY LIGHTING IN AUTOMATIC HITCH OPERATION

FIELD OF THE INVENTION

The present invention generally relates to a vehicle hitch assistance system. In particular, the system provides the user with various options for assisting in hitching a vehicle with a trailer and targets for initial alignment of the vehicle prior to assistance in hitching.

BACKGROUND OF THE INVENTION

Hitching a trailer to a vehicle can be a difficult and time-consuming experience. In particular, aligning a vehicle hitch ball with the desired trailer hitch can, depending on the initial location of the trailer relative to the vehicle, require repeated forward and reverse driving coordinated with multiple steering maneuvers to appropriately position the vehicle. Further, through a significant portion of the driving needed for appropriate hitch ball alignment, the trailer hitch cannot be seen, and the hitch ball can, under ordinary circumstance, never actually be seen by the driver. This lack of sight lines requires inference of the positioning of the hitch ball and hitch based on experience with a particular vehicle and trailer, and can still require multiple instances of stopping and stepping out of the vehicle to confirm alignment or to note an appropriate correction for a subsequent set of maneuvers. Even further, the closeness of the hitch ball to the rear bumper of the vehicle means that any overshoot can cause a collision of the vehicle with the trailer. Accordingly, further advancements may be desired.

SUMMARY OF THE INVENTION

According to one aspect of the disclosure, a vehicle hitching assistance system includes a controller acquiring image data from the vehicle and identifying a trailer within a specified area of the image data and then identifying a coupler of the trailer. The specified area is less than a total field of the image data. The controller then outputs a steering signal to the vehicle to cause the vehicle to steer to align a hitch ball of the vehicle with the coupler.

Embodiments of the first aspect of the disclosure can include any one or a combination of the following features or aspects:

the controller may acquire the image data from an imaging system included with the vehicle, the imaging system having at least one camera, the total field of the image data corresponding with a total field of view of the at least one camera;

the controller may output the steering signal to a steering system included with the vehicle, and the controller may derive the steering signal based on at least a maximum steering angle of the steering system;

the specified area of the image data can be a target area disposed within a central portion of the image data;

the specified area of the image data can be within a designated boundary comprising respective portions based on a resolution of the image data, a proportion of the trailer relative to the total field, and a known steering limit of the vehicle;

the respective portions of the designated boundary may be based on a correlation of the total field of the image data with an area of an assumed ground plane on which the vehicle is positioned visible within the total field;

the area of the assumed ground plane may include a maximum coupler detection distance corresponding with the resolution of the image data, a minimum trailer identification distance corresponding with the proportion of the trailer relative to the total field, and left and right maximum steerable paths extending from the vehicle in a reversing direction corresponding with the known steering limit of the vehicle;

the controller may further output a video image displayable on a human-machine interface within the vehicle including the image data and a graphic overlay of the specified area on the image data in a proportionally correlated manner;

the controller may output the graphic overlay in the video image upon activation of the system;

the controller may receive an input from the human-machine interface corresponding with a user indication of a trailer within the image data and may output the graphic overlay in the video image only after receiving the user indication of the trailer within the image data and failing to identify a trailer within the specified area of the image data;

the controller may further cause the vehicle to illuminate one or more exterior lights directed toward a rear of the vehicle prior to acquiring the image data from the vehicle; and the controller may identify the trailer within the specified area of the image data and then identify a coupler of the trailer and output a steering signal to the vehicle to cause the vehicle to steer to an align a hitch ball of the vehicle with the coupler as a part of a first hitch assist mode implemented when the controller determines that a sensing condition and a visibility condition are met, further implement a second hitch assistance mode when one of the sensing condition and the visibility condition are not met, receive a selection signal from the vehicle corresponding with a user selection of a mode before implementing either the first or second hitch assistance mode, and cause the vehicle to present an indication that the first hitch assist mode may not be selected when one of the sensing condition and the visibility condition are not met.

According to another aspect of the disclosure, a vehicle includes a steering system, at least one exterior light mounted on and directed away from a rear of the vehicle, and a controller. The controller causes the at least one exterior light to illuminate, acquiring image data from the vehicle, identifies a trailer within the image data, and outputs a steering signal to the vehicle steering system to an align a hitch ball of the vehicle with a coupler of the trailer.

According to another aspect of the disclosure, a method for assisting a vehicle in hitching with a trailer includes acquiring image data for a field of view away from a rear of the vehicle, identifying a trailer within a specified area less than the field of view of the image data and then identifying a coupler of the trailer, and outputting a steering signal to cause the vehicle to steer to an align a hitch ball of the vehicle with the coupler.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
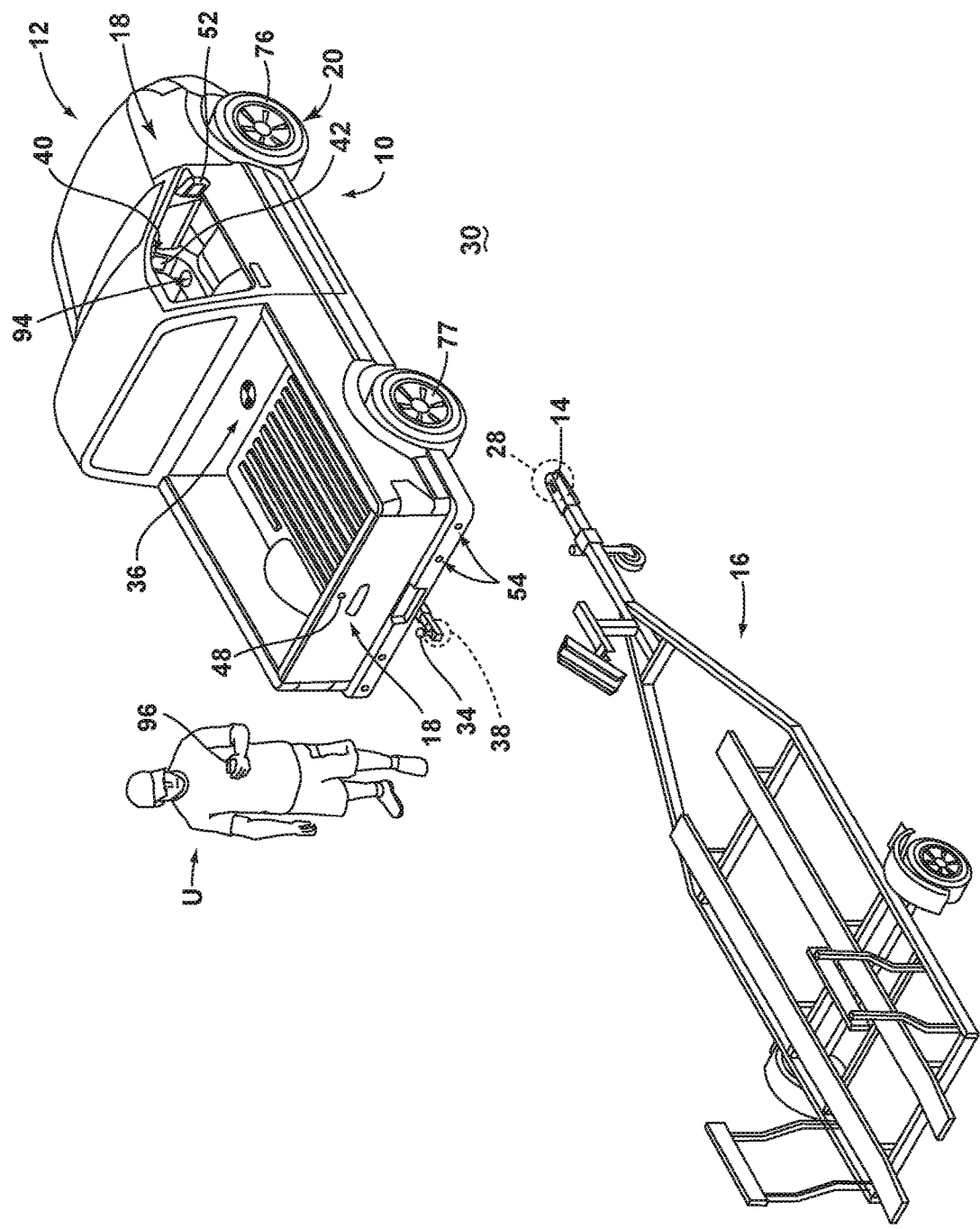
FIG. 1 is a perspective view of a vehicle in an unhitched position relative to a trailer.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Figure 2:
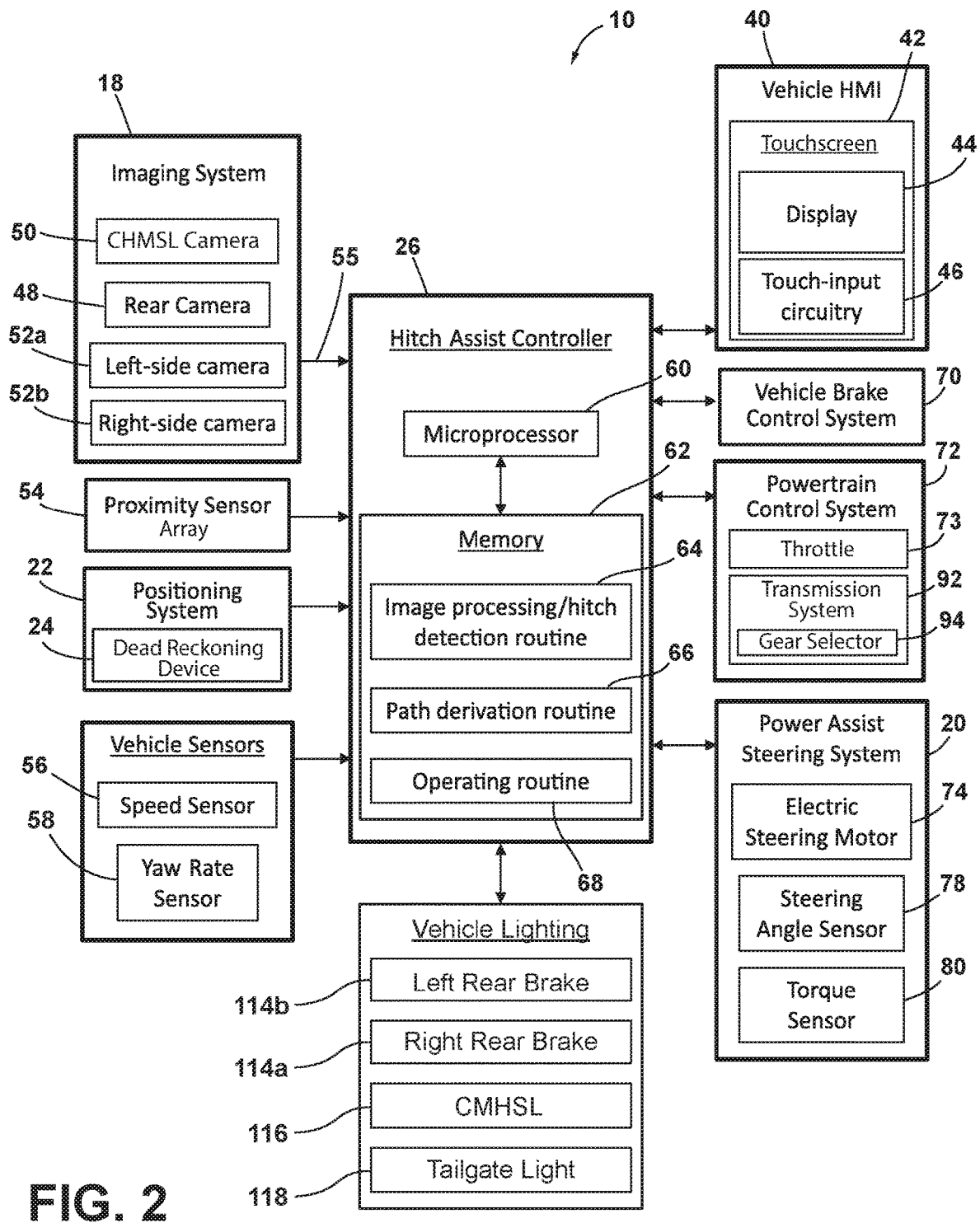
FIG. 2 is a diagram of a system according to an aspect of the disclosure for assisting in aligning the vehicle with a trailer in a position for hitching the trailer to the vehicle.

Referring generally to FIGS. 1 and 2, reference numeral 10 designates a hitch assistance system (also referred to as a "hitch assist" system) for a vehicle 12. In particular, hitch assistance system 10 includes a controller 26 a controller acquiring image data 55 from the vehicle 12 and identifying a trailer 16 within a specified area 45 of the image data 55 and then identifying a coupler 14 of the trailer 16, the specified area 45 being less than a total field 53 of the image data 55. The controller 26 further outputs a steering signal to the vehicle 12 to cause the vehicle 12 to steer to align a hitch ball 34 of the vehicle 12 with the coupler 34.

With respect to the general operation of the hitch assist system 10, as illustrated in the system diagram of FIG. 2, system 10 includes various sensors and devices that obtain or otherwise provide vehicle status-related information. This information includes positioning information from a positioning system 22, which may include a dead reckoning device 24 or, in addition or as an alternative, a global positioning system (GPS), to determine a coordinate location of the vehicle 12 based on the one or more locations of the devices within the positioning system 22. In particular, the dead reckoning device 24 can establish and track the coordinate location of the vehicle 12 within a localized coordinate system 82 based at least on vehicle speed and steering angle $\delta$. Other vehicle information received by hitch assist system 10 may include a speed of the vehicle 12 from a speed sensor 56 and a yaw rate of the vehicle 12 from a yaw rate sensor 58. It is contemplated that in additional embodiments, a proximity sensor 54 or an array thereof, and other vehicle sensors and devices may provide sensor signals or other information, such as sequential images of a trailer 16, including the detected coupler 14, that the controller 26 of the hitch assist system 10 may process with various routines to determine the height H and position (e.g., based on the distance $D_h$ and angle $\alpha_h$) of coupler 14.

As further shown in FIG. 2, one embodiment of the hitch assist system 10 is in communication with the steering system 20 of vehicle 12, which may be a power assist steering system 20 including an electric steering motor 74 to operate the steered wheels 76 (FIG. 1) of the vehicle 12 for moving the vehicle 12 in such a manner that the vehicle yaw changes with the vehicle velocity and the steering angle δ. In the illustrated embodiment, the power assist steering system 20 is an electric power-assisted steering ("EPAS") system including electric steering motor 74 for turning the steered wheels 76 to a steering angle δ based on a steering command, whereby the steering angle δ may be sensed by a steering angle sensor 78 of the power assist steering system 20. The steering command 69 may be provided by the hitch assist system 10 for autonomously steering during a trailer hitch alignment maneuver and may alternatively be provided manually via a rotational position (e.g., steering wheel angle) of a steering wheel of vehicle 12. However, in the illustrated embodiment, the steering wheel of the vehicle 12 is mechanically coupled with the steered wheels 76 of the vehicle 12, such that the steering wheel moves in concert with steered wheels 76, preventing manual intervention with the steering wheel during autonomous steering. More specifically, a torque sensor 80 is provided on the power assist steering system 20 that senses torque on the steering wheel that is not expected from autonomous control of the steering wheel and therefore indicative of manual intervention, whereby the hitch assist system 10 may alert the driver to discontinue manual intervention with the steering wheel and/or discontinue autonomous steering. In alternative embodiments, some vehicles have a power assist steering system 20 that allows a steering wheel to be partially decoupled from movement of the steered wheels 76 of such a vehicle.

Figure 3:
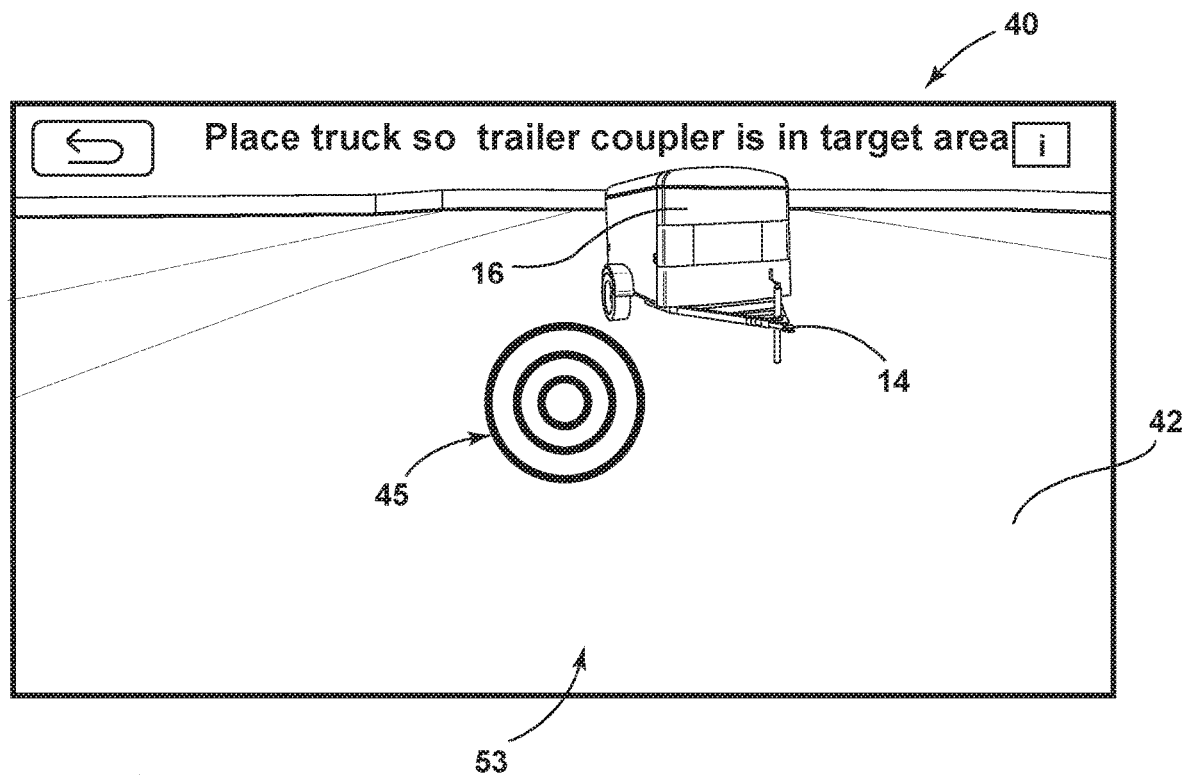
FIG. 3 is a depiction of an image received from a vehicle camera during an alignment sequence step with a target overlaid thereon.

With continued reference to FIG. 2, the power assist steering system 20 provides the controller 26 of the hitch assist system 10 with information relating to a rotational position of steered wheels 76 of the vehicle 12, including a steering angle δ. The controller 26 in the illustrated embodiment processes the current steering angle, in addition to other vehicle 12 conditions to guide the vehicle 12 along the desired path 32 (FIG. 3). It is conceivable that the hitch assist system 10, in additional embodiments, may be an integrated component of the power assist steering system 20. For example, the power assist steering system 20 may include a hitch assist algorithm for generating vehicle steering information and commands as a function of all or a portion of information received from the imaging system 18, the power assist steering system 20, a vehicle brake control system 70, a powertrain control system 72, and other vehicle sensors and devices, as well as a human-machine interface 40, as discussed further below.

As also illustrated in FIG. 2, the vehicle brake control system 70 may also communicate with the controller 26 to provide the hitch assist system 10 with braking information, such as vehicle wheel speed, and to receive braking commands from the controller 26. For instance, vehicle speed information can be determined from individual wheel speeds as monitored by the brake control system 70. Vehicle speed may also be determined from the powertrain control system 72, the speed sensor 56, and the positioning system 22, among other conceivable means. In some embodiments, individual wheel speeds can also be used to determine a vehicle yaw rate γ&, which can be provided to the hitch assist system 10 in the alternative or in addition to the vehicle yaw rate sensor 58. The hitch assist system 10 can, further, provide vehicle braking information to the brake control system 70 for allowing the hitch assist system 10 to control braking of the vehicle 12 during backing of the trailer 16. For example, the hitch assist system 10, in some embodiments, may regulate speed of the vehicle 12 during alignment of the vehicle 12 with the coupler 14 of trailer 16, which can reduce the potential for a collision with trailer 16, and can bring vehicle 12 to a complete stop at a determined endpoint 35 of path 32. It is disclosed herein that the hitch assist system 10 can additionally or alternatively issue an alert signal corresponding to a notification of an actual, impending, and/or anticipated collision with a portion of trailer 16. The powertrain control system 72, as shown in the embodiment illustrated in FIG. 2, may also interact with the hitch assist system 10 for regulating speed and acceleration of the vehicle 12 during partial or autonomous alignment with trailer 16. As mentioned above, regulation of the speed of the vehicle 12 may be advantageous to prevent collision with trailer 16.

Additionally, the hitch assist system 10 may communicate with human-machine interface ("HMI") 40 for the vehicle 12. The HMI 40 may include a vehicle display 44, such as a center-stack mounted navigation or entertainment display (FIG. 1). HMI 40 further includes an input device, which can be implemented by configuring display 44 as a portion of a touchscreen 42 with circuitry 46 to receive an input corresponding with a location over display 44. Other forms of input, including one or more joysticks, digital input pads, or the like can be used in place or in addition to touchscreen 42. Further, the hitch assist system 10 may communicate via wireless communication with another embodiment of the HMI 40, such as with one or more handheld or portable devices 96 (FIG. 1), including one or more smartphones. The portable device 96 may also include the display 44 for displaying one or more images and other information to a user. For instance, the portable device 96 may display one or more images of the trailer 16 on the display 44 and may be further able to receive remote user inputs via touchscreen circuitry 46. In addition, the portable device 96 may provide feedback information, such as visual, audible, and tactile alerts.

Still referring to the embodiment shown in FIG. 2, the controller 26 is configured with a microprocessor 60 to process logic and routines stored in memory 62 that receive information from the above-described sensors and vehicle systems, including the imaging system 18, the power assist steering system 20, the vehicle brake control system 70, the powertrain control system 72, and other vehicle sensors and devices. The controller 26 may generate vehicle steering information and commands as a function of all or a portion of the information received. Thereafter, the vehicle steering information and commands may be provided to the power assist steering system 20 for affecting steering of the vehicle 12 to achieve a commanded path 32 (FIG. 3) of travel for alignment with the coupler 14 of trailer 16. The controller 26 may include the microprocessor 60 and/or other analog and/or digital circuitry for processing one or more routines. Also, the controller 26 may include the memory 62 for storing one or more routines, including an image processing 64 routine and/or hitch detection routine, a path derivation routine 66, and an operating routine 68. It should be appreciated that the controller 26 may be a stand-alone dedicated controller or may be a shared controller integrated with other control functions, such as integrated with a vehicle sensor system, the power assist steering system 20, and other conceivable onboard or off-board vehicle control systems. It should further be appreciated that the image processing routine 64 may be carried out by a dedicated processor, for example, within a stand-alone imaging system for vehicle 12 that can output the results of its image processing to other components and systems of vehicle 12, including microprocessor 60. Further, any system, computer, processor, or the like that completes image processing functionality, such as that described herein, may be referred to herein as an "image processor" regardless of other functionality it may also implement (including simultaneously with executing image processing routine 64).

System 10 can also incorporate an imaging system 18 that includes one or more exterior cameras, which in the illustrated examples include rear camera 48, center high-mount stop light (CMHSL) camera 50, and side-view cameras 52a and 52b, although other arrangements including additional or alternative cameras are possible. In one example, imaging system 18 can include rear camera 48 alone or can be configured such that system 10 utilizes only rear camera 48 in a vehicle with multiple exterior cameras. In another example, the various cameras 48, 50, 52a, 52b included in imaging system 18 can be positioned to generally overlap in their respective fields of view, which may correspond with rear camera 48, center high-mount stop light (CMHSL) camera 50, and side-view cameras 52a and 52b, respectively. In this manner, image data 55 from two or more of the cameras can be combined in image processing routine 64, or in another dedicated image processor within imaging system 18, into a single image. In an extension of such an example, the image data 55 can be used to derive stereoscopic image data that can be used to reconstruct a three-dimensional scene of the area or areas within overlapped areas of the various fields of view 49, 51, 53a, 53b, including any objects (obstacles or coupler 14, for example) therein. In an embodiment, the use of two images including the same object can be used to determine a location of the object relative to the two image sources, given a known spatial relationship between the image sources. In this respect, the image processing routine 64 can use known programming and/or functionality to identify an object within image data 55 from the various cameras 48, 50, 52a, and 52b within imaging system 18. In either example, the image processing routine 64 can include information related to the positioning of any cameras 48, 50, 52a, and 52b present on vehicle 12 or utilized by system 10, including relative to the center 36 (FIG. 1) of vehicle 12, for example such that the positions of cameras 48, 50, 52a, and 52b relative to center 36 and/or to each other can be used for object positioning calculations and to result in object position data relative to the center 36 of vehicle 12, for example, or other features of vehicle 12, such as hitch ball 34 (FIG. 1), with known positions relative to center 36.

Figure 4:
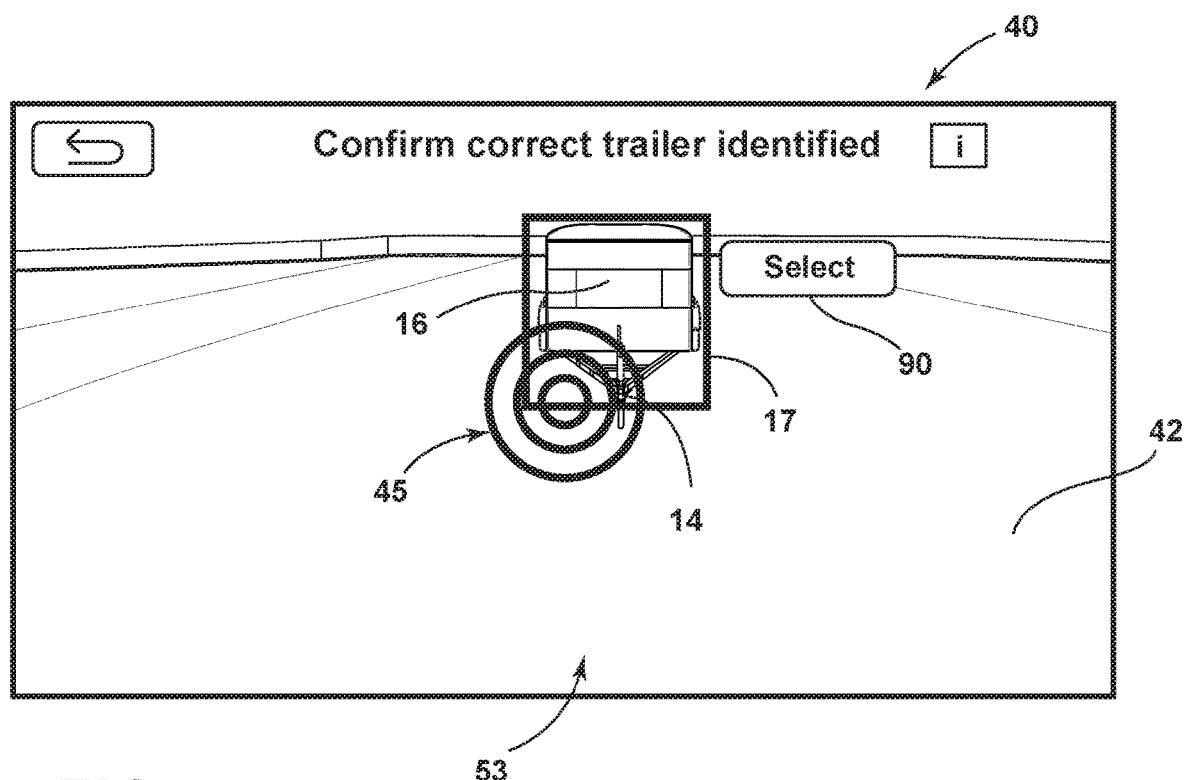
FIG. 4 is an further depiction of an image received from a vehicle camera during a subsequent alignment sequence step with the target and additional information overlaid thereon.

The image processing routine 64 can be specifically programmed or otherwise configured to locate coupler 14 within image data 55. In the example of FIGS. 3 and 4, the image processing routine 64 can first attempt to identify any trailers 16 within the image data 55, which can be done based on stored or otherwise known visual characteristics of trailer 16, of an number of different types, sizes or configurations of trailers compatible with system 10, or trailers in general. When a trailer 16 is identified, system 10 may cause an indication of such identification to be presented to the user via the vehicle HMI, including the box 17 shown in FIG. 4, which can be superimposed on the image presented on HMI 40 by or based on an output from controller 26. In connection with such an identification and indication 17 of trailer 16, controller 26 can seek confirmation from the user that the identification of the trailer 16 is accurate and is the correct trailer for which to complete an automated hitching operation, as described further below. In the illustrated example, a graphical button 90 can be presented on HMI 40 adjacent the trailer indication box 17 and the user can be requested to confirm the trailer identification before controller 26 proceeds with the automated hitching operation.

After the trailer 16 is identified, controller 26 may then identify the coupler 14 of that trailer 16 within the image data 55 based, similarly, on stored or otherwise known visual characteristics of coupler 14 or couplers in general. In another embodiment, a marker in the form of a sticker or the like may be affixed with trailer 16 in a specified position relative to coupler 14 in a manner similar to that which is described in commonly-assigned U.S. Pat. No. 9,102,271, the entire disclosure of which is incorporated by reference herein. In such an embodiment, image processing routine 64 may be programmed with identifying characteristics of the marker for location in image data 55, as well as the positioning of coupler 14 relative to such a marker so that the location 28 of coupler 14 can be determined based on the marker location. Additionally or alternatively, controller 26 may seek confirmation of the determined coupler 14, via a prompt on touchscreen 42 similar to the box 17 used to prompt for confirmation the trailer 16. If the coupler 14 determination is not confirmed, further image processing may be provided, or user-adjustment of the position 28 of coupler 14 may be facilitated, either using touchscreen 42 or another input to allow the user to move the depicted position 28 of coupler 14 on touchscreen 42, which controller 26 uses to adjust the determination of position 28 of coupler 14 with respect to vehicle 12 based on the above-described use of image data 55. In various examples, controller 26 may initially rely on the identification of trailer 16 for the initial stages of an automated hitching operation, with the path 32 being derived to move the hitch ball 34 toward a centrally-aligned position with respect to trailer 16 with the path 32 being refined once the coupler 14 is identified. Such an operational scheme can be implemented when it is determined that trailer 16 is at a far enough distance from vehicle 12 to begin backing without knowing the precise endpoint 35 of path 32 and can be useful when trailer 16 is at a distance where the resolution of the image data 55 makes it possible to accurately identify trailer 16, but at which the coupler 14 cannot be precisely identified. In this manner, initial rearward movement of vehicle 12 can allow for calibration of various system 12 inputs or measurements that can improve the accuracy of distance measurements, for example, that can help make coupler 14 identification more accurate. Similarly, movement of vehicle 12 resulting in a change to the particular image within the data 55 that can improve the resolution or move the coupler 14 relative to the remaining portions of trailer 16 such that it can be more easily identified.

In this manner, the initial determination of the position 28 of trailer 16 to an accepted level of accuracy is needed for execution of the path derivation routine 66 and subsequent automated backing of vehicle 12 along the path 32. Various characteristics or limitations of system 10 may impact the ability of system 10 to identify the trailer 16 (as well as the coupler 14, whenever such identification is carried out) in the data 55 received from imaging system 18 under certain conditions or in certain settings. Still further, various vehicle 12 or other system 10 characteristics may impact the ability of system 10 to navigate to reach a trailer 16 that is, nevertheless, present within the image data 55. Depending on the particular configuration of system 10, such characteristics can be partially driven by the imaging system 18 used by system 10. The imaging system 18 may be limited in its ability to identify a trailer 16 and/or coupler 14 within the entire field of the image data 55. In an example, it may be assumed, at least for simplicity of illustration, that system 10 only uses rear camera 48 for trailer 16 and coupler 14 detection, with rear camera 48 having a field of view 49 that is included in its entirety in the "total field" of the image data 55 (notably, if additional cameras 50, 52a, 52b are used, the total field of the image data 55 would include the entire assembled image from all such utilized cameras). The imaging system 18 limitations may limit system 10 functionality to only a limited distance between trailer coupler 14 and the vehicle 12, as different factors may limit the ability of controller 26 in identifying a trailer 16 or its coupler 14 when the trailer 16 and vehicle 12 are too close together or too far apart. For example, the resolution of the various cameras 48, 50, 52a, 52b in imaging system 18 may impact the ability to identify any trailers 16 or couplers 14 beyond a maximum distance R1 from vehicle 12 with the particular value of R1 being influenced by ambient conditions, including available light and/or weather conditions (e.g., rain or snow).

Additionally, a minimum distance R2 for trailer 16 or coupler 14 detection may be realized because certain implementations of system 10 may rely on dynamic readings (such as of the ground surface behind vehicle 12 or other features visible around coupler 14) to calibrate system 10 and or to track vehicle 12 speed in reversing and to track the position of coupler 14 during system 10 operation. In particular, in the above example where only rear camera 48 is used by system 10, it may be necessary to detect motion within the field of view 49 to identify distance to the coupler 14 and to provide accurate tracking and boundary resolution (an aspect of image processing routine 64). Further, the operating routine 68 may include a longitudinal control algorithm that relies on precise control of the vehicle 12, and a minimum amount of travel distance corresponding with R2 in an example, is required to calibrate certain braking and powertrain variables to achieve such vehicle control. Still further, if a trailer 16 is too close to vehicle 12, various features of the trailer 16 may appear as trailers themselves to the image processing routine 64, meaning that to assist system 10, the trailer 16 should be beyond the minimum distance R2 such that a proportionality of features, including of trailer 16 itself as well as of trailer 16 relative to the total field of image data 55, is optimized for image processing routine 64 functionality.

Additionally, other limitations of system 10 functionality may add constraints to the acceptable zone of operation. In this respect, system 10 may not be capable of maneuvering vehicle 12 towards all locations in an initial view of the rear camera 48 (i.e., during trailer 16 or coupler 14 identification). In particular, system 10 is restricted in its ability to reach a potential target position due, but not limited, to a lateral span that is a function of a distance range and the steering angle δ limitations of vehicle 12. In one aspect, the maximum steering angle $\delta_{max}$ of the vehicle 12 determines the lateral range, as a function of distance $D_c$ to coupler 14, as discussed further below. In general, an implementation of system 10 may restrict maneuvering of vehicle 12 to a single reversing motion that, while potentially including steering in both the left and right directions, does not incorporate forward driving of vehicle 12 between successive instances of reverse driving, for example. In this manner, the maximum lateral distance that can be traversed by vehicle 12 in an automated hitching operation is limited by the maximum steering angle $\delta_{max}$. As the vehicle 12 travels laterally by turning the steered wheels 76 and reversing, the lateral limits of system operability 10 are determined as, essentially, a theoretical hitch ball 34 path extending rearward of the vehicle corresponding with steering of vehicle 12 at the maximum steering angle under reversing of vehicle to either side. In this manner, the lateral limits of system 10 may extend outwardly from vehicle 12, with increasing distance away from vehicle 12. In a further aspect, the steering angle δ may be limited to an angle $\delta_a$ that is lower than maximum steering angle $\delta_{max}$ based on predetermined constraints for allowable swing of the front end of vehicle 12. In this manner, the lateral limits of system 10 functionality may be further limited.

Because of these limitations, the present system 10 may be configured to only function with trailers 16 and associated couplers 14 positioned inside a "valid" region of space relative to the vehicle 12. The region is determined by the factors listed above, and, potentially, any additional factors that affect the system 10 capability. To ensure such positioning of vehicle 12 relative to trailer 16, system 10 can be generally configured to direct the user to position vehicle 12 relative to trailer 16 such that trailer 16 is within such a valid area of the field of view of the utilized cameras, such as field of view 49 of rear camera 48, and the corresponding image data 55. As shown in FIGS. 3 and 4, this direction may be given by way of presenting a target 45 as a graphical overlay on a real-time video image 53 of the image data 55 from one or more of the cameras 48, 50, 52a, 52b in imaging system 18 presented on screen 44. The target 45 may be derived and/or presented on screen 44 according to various characteristics of system 10 described above and may balance these characteristics and system requirements to provide widely useable functionality of system 10, overall. In this manner, the target 45 be positioned within the image 53 in a location that is determined to correspond with an actual location relative to vehicle 12 relative to the ground plane 30 on which vehicle 12 is positioned (and on which trailer 16 may be assumed to be present, regardless of actual ground characteristics) that is within the valid zone for trailer 16 and coupler 14 detection and vehicle 12 navigation for alignment therewith. In the example show, the target 45 may not directly correspond with the complete area within which such detection and navigation is possible, but may rather be a general area that is reliably within the acceptable zone, and requires placement of the coupler 14 and/or trailer 16 within a certain distance from vehicle 12, including within a maximum and minimum distance from vehicle 12, as well as within a predetermined maximum lateral offset from vehicle 12. As shown, this may result in the target 45 being positioned generally centrally within the image 53 in both the horizontal and vertical directions and may represent, for example about 5-15% of the total area of image 53. In some instances, target 45 may not be exactly centered within image 53, at least in the vertical direction, with target 45 potentially being centered between about 30% and 50% of the vertical distance of image 54. In various examples, the positioning of the particular camera(s), such as camera 48, on vehicle 12, as well as the characteristics (focal length, etc.) of the camera(s).

When initiated, system 10 can automatically attempt to identify a trailer 16 within the area of target 45 while prompting the driver to position vehicle 12 such that the coupler 14 and/or trailer 16 is within the area of target 45. When a trailer 16, including its coupler 14, are detected (which would generally coincide with positioning thereof within the area of target 45, system 10 can indicate such an identification, as discussed above, by highlighting the trailer with box 17 (FIG. 4), while instructing the driver to confirm (by pressing button 90, for example) to confirm that the desired trailer 16 has been identified or to select the target trailer 16 from one or more identified trailers 16. At which point, vehicle 12, according to various potential interactive schemes, can acquire control of vehicle 12 from the user and can control vehicle 12 in aligning hitch ball 34 with coupler 14 for hitching of vehicle 12 with the trailer 16.

Figure 5:
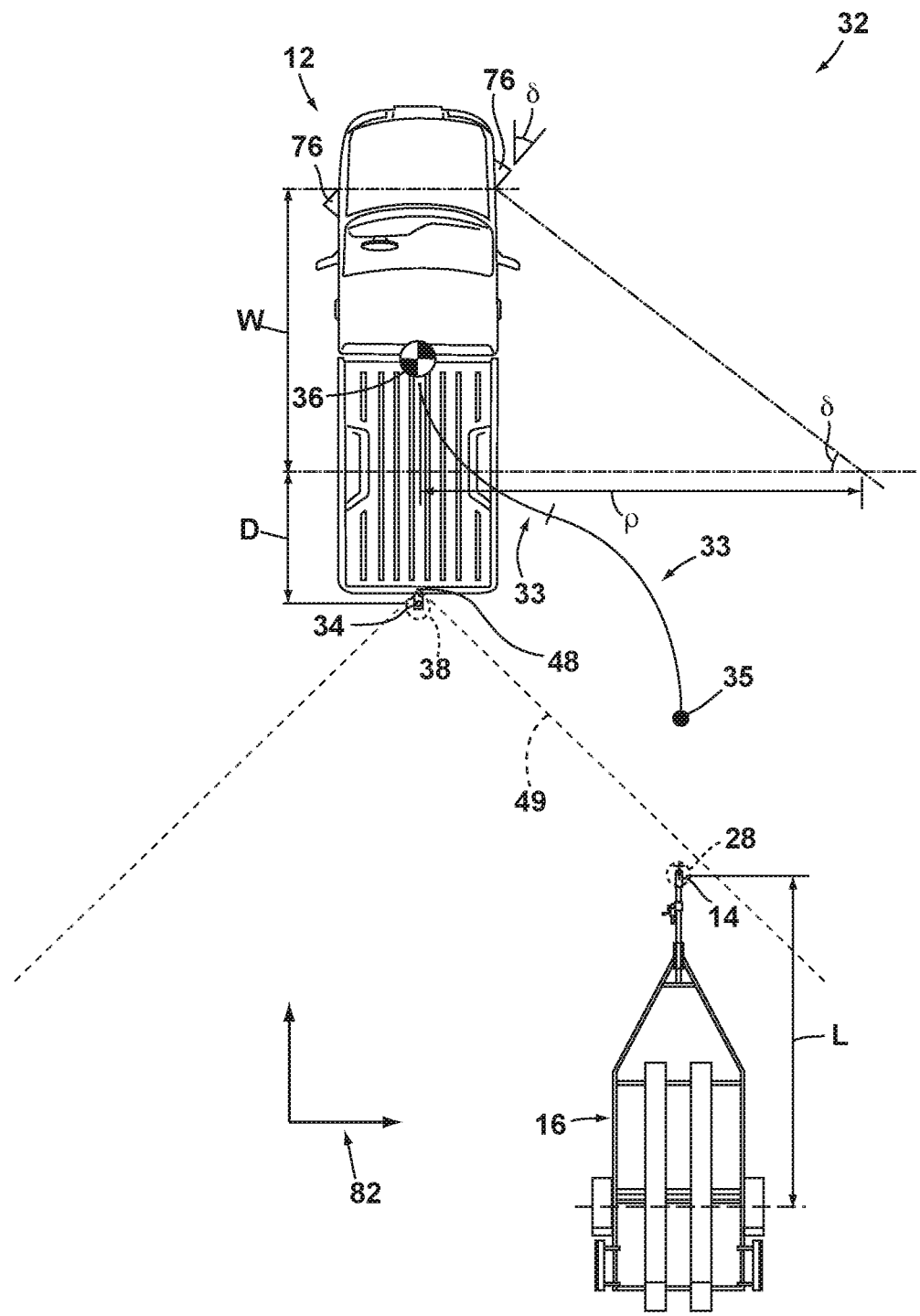
FIG. 5 is an overhead schematic view of a vehicle during a step of the alignment sequence with the trailer.

As shown in FIG. 5, the image processing routine 64 and operating routine 68 may be used in conjunction with each other to determine the path 32 along which hitch assist system 10 can guide vehicle 12 to align hitch ball 34 and coupler 14 of trailer 16. Upon initiation of hitch assist system 10, such as by user input on touchscreen 42, for example, image processing routine 64 can identify coupler 14 within the image data 55 and at least attempt to estimate the position 28 of coupler 14 relative to hitch ball 34 using the image data 55 in accordance with one of the examples discussed above to determine a distance $D_c$ to coupler 14 and an angle $\alpha_c$ of offset between coupler 14 and the longitudinal axis of vehicle 12. Image processing routine 64 can also be configured to identify the trailer 16 overall and can use the image data of trailer 16, alone or in combination with the image data of coupler 14, to determine the orientation or heading 33 of trailer 16. In this manner the path 32 can further be derived to align vehicle 12 with respect to trailer 16 with the longitudinal axis 13 of vehicle 12 within a predetermined angular range of the heading 33 of trailer 16. Notably, such alignment may not require that the longitudinal axis 13 of vehicle 12 is parallel or collinear with the heading 33 of trailer 16, but may simply be within a range that generally allows connection of hitch ball 34 with coupler 14 without collision between vehicle 12 and trailer 16 and may, further allow immediate controlled backing of trailer 16 using vehicle 12. In this manner, the angular range may be such that the alignment of vehicle 12 with trailer 16 at the end of the operating routine 68 is such that the angle between longitudinal axis 13 and heading 33 is less than the jackknife angle between the vehicle 12 and trailer 16 when coupled or a reasonable estimate thereof. In one example, the angular range may be such that longitudinal axis 13 is within about 30° from collinear with heading 33 in either direction. In various examples, such as when the length L of trailer 16 is known, the angular range may be greater, when permitted, or may be less, depending on the desired tolerance of system 10.

When collected, the position information can then be used in light of the position 28 of coupler 14 within the field of view of the image data 55 to determine or estimate the height $H_c$ of coupler 14. Once the positioning $D_c$, $\alpha_c$ of coupler 14 has been determined and, optionally, confirmed by the user, controller 26 can take control of at least the vehicle steering system 20 to control the movement of vehicle 12 along the desired path 32 to align the vehicle hitch ball 34 with coupler 14, as discussed further below.

Continuing with reference to FIG. 5 with additional reference to FIG. 2, controller 26, having estimated the positioning $D_c$, $\alpha_c$ of coupler 14, as discussed above, can, in one example, execute path derivation routine 66 to determine vehicle path 32 to align the vehicle hitch ball 34 with coupler 14. In particular, controller 26 can have stored in memory 62 various characteristics of vehicle 12, including the wheelbase W, the distance from the rear axle to the hitch ball 34, which is referred to herein as the drawbar length L, as well as the maximum angle to which the steered wheels 76 can be turned $\delta_{max}$. As shown, the wheelbase W and the current steering angle δ can be used to determine a corresponding turning radius ρ for vehicle 12 according to the equation:

$$\rho = \frac{1}{W \tan \delta}, \quad (1)$$

in which the wheelbase W is fixed and the steering angle δ can be controlled by controller 26 by communication with steering system 20, as discussed above. In this manner, when the maximum steering angle $\delta_{max}$ is known, the smallest possible value for the turning radius $\rho_{min}$ is determined as:

$$\rho_{min} = \frac{1}{W \tan \delta_{max}}. \quad (2)$$

Path derivation routine 66 can be programmed to derive vehicle path 32 to align a known location of the vehicle hitch ball 34 with the estimated position 28 of coupler 14 that takes into account the determined minimum turning radius $\rho_{min}$ to allow path 32 to use the minimum amount of space and maneuvers. In this manner, path derivation routine 66 can use the position of vehicle 12, which can be based on the center 36 of vehicle 12, a location along the rear axle, the location of the dead reckoning device 24, or another known location on the coordinate system 82, to determine both a lateral distance to the coupler 14 and a forward or rearward distance to coupler 14 and derive a path 32 that achieves the needed lateral and forward-backward movement of vehicle 12 within the limitations of steering system 20. The derivation of path 32 further takes into account the positioning of hitch ball 34, based on length L, relative to the tracked location of vehicle 12 (which may correspond with the center 36 of mass of vehicle 12, the location of a GPS receiver, or another specified, known area) to determine the needed positioning of vehicle 12 to align hitch ball 34 with coupler 14. It is noted that hitch assist system 10 can compensate for horizontal movement Δx of coupler 14 in a driving direction away from axle 84 by determining the movement of coupler 14 in the vertical direction Δy that will be needed to receive hitch ball 34 within coupler 14. Such functionality is discussed further in co-pending, commonly-assigned U.S. patent application Ser. No. 14/736,391 and Ser. No. 16/038,462, the entire disclosures of which are hereby incorporated by reference herein.

As discussed above, once the desired path 32, including endpoint 35, has been determined using either of the offset determination schemes discussed above, controller 26 is then allowed to at least control the steering system 20 of vehicle 12 with the powertrain control system 72 and the brake control system 70 (whether controlled by the driver or by controller 26, as discussed below) controlling the velocity (forward or rearward) of vehicle 12. In this manner, controller 26 can receive data regarding the position of vehicle 12 during movement thereof from positioning system 22 while controlling steering system 20, as needed to maintain vehicle 12 along path 32. In particular, the path 32, having been determined based on the vehicle 12 and the geometry of steering system 20, can adjust the steering angle δ, as dictated by path 32, depending on the position of vehicle 12 therealong. It is additionally noted that in an embodiment, the path 32 may comprise a progression of steering angle δ adjustment that is dependent on the tracked vehicle position.

As illustrated in FIG. 5, vehicle path 32 can be determined to achieve the needed lateral and rearward movement within the smallest area possible and/or with the lowest number of maneuvers. In the illustrated example of FIG. 5, path 32 can include two portions defined by steering of wheels 76 in different directions to collectively traverse the needed lateral movement of vehicle 12, while providing final straight, rearward backing segment to bring hitch ball 34 into the above-described offset alignment with coupler 14. It is noted that variations in the depicted path 32 may be used. It is further noted that the estimates for the positioning $D_c$, $α_c$ of coupler 14 may become more accurate as vehicle 12 traverses path 32, including to position vehicle 12 in front of trailer 16 and as vehicle 12 approaches coupler 14. Accordingly, such estimates can be continuously derived and used to update path derivation routine 66, if necessary, in the determination of the adjusted endpoint 35 for path 32, as discussed above. In a similar manner, the path 32, as derived using the position and orientation data acquired from smartphone 96, can be fine-tuned once the image processing routine 64 can identify coupler 14 in the image data 55, with continued updates for path 32 being similarly derived as the image data 55 becomes increasingly clear during the approach toward trailer 16. It is further noted that, until such a determination can be made, the dead reckoning device 24 can be used to track the location of vehicle 12 in its movement along path 32 toward the initially-derived endpoint 35.

As discussed above, system 10 requires the availability of a number of measurements obtained using imaging system 18 and, optionally, various sensors 54 and devices 22, as well as reliable control of the steering, 20, powertrain 72 and braking 70 systems to implement the image processing 64, path derivation 66, and operating routines 68 for control the backing of vehicle 12 according to the process described above. Accordingly, the inability of system 10 to obtain any such measurements or to reliably control any of the involved vehicle systems can impact the ability of system 10 to reliably carry out the above hitching process. Accordingly, system 10 may also be configured to provide multiple levels of hitching assistance depending on both user preference, as well as measurement availability and control reliability. For example, a user may not feel comfortable relinquishing control (completely or at all) of vehicle 12, but may still prefer some level of guidance in aligning hitch ball 26 with coupler 14. In other examples, visibility by way of available light or weather may impact the ability of system 10 locate or track coupler 14, even when trailer 16 is within the above-described acceptable zone, or system 10 may determine that for various reasons, the steering 20 and braking 70 systems cannot be reliably controlled. Generally, control of the steering 20 system may be impacted by vehicle 12 being positioned on a transverse slope, which may cause wheel slip to cause vehicle 12 to travel on an unexpected path, and moisture, for example, may cause the brake system 70 functionality. Still further, positioning of vehicle 12 on soft ground or on an upward or downward slope may make powertrain 72 or braking 70 system control operate out of an optimal range. These or other conditions may diminish to the point where reliable control by system 10 is not available.

Figure 6:
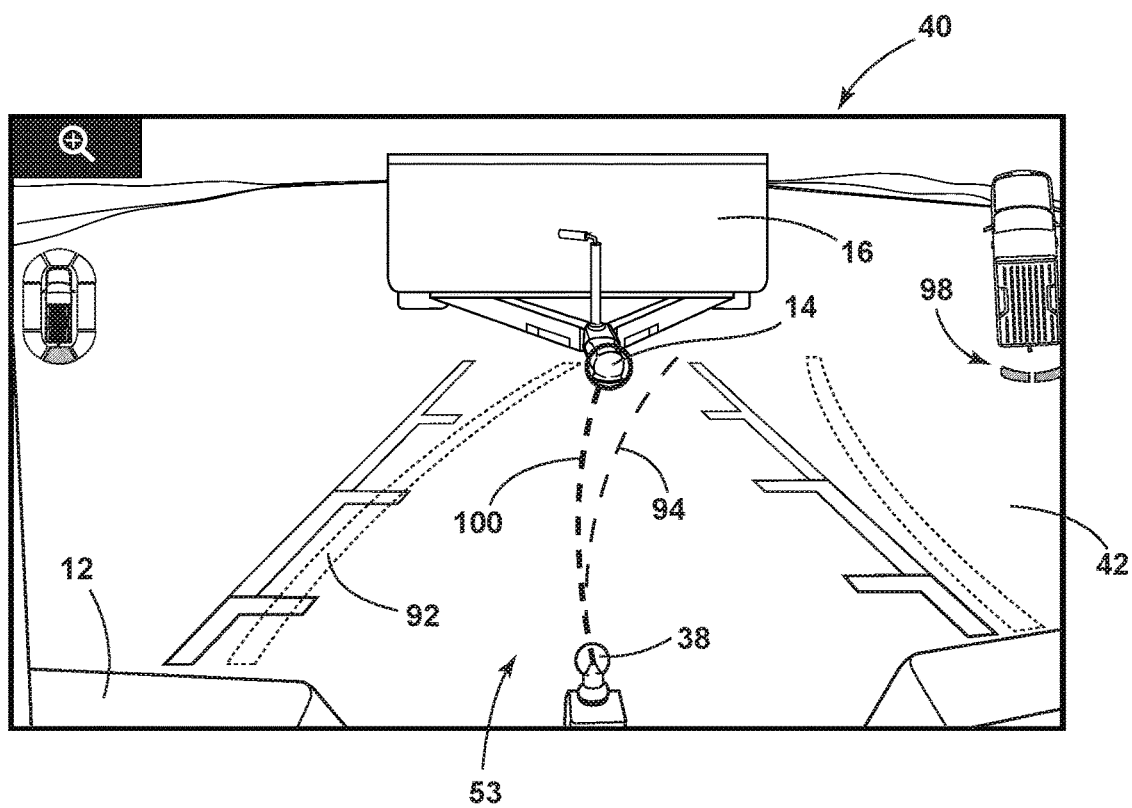
FIG. 6 is a depiction of an image received from the vehicle camera during an alternative alignment sequence step with a various guidance paths overlaid thereon.
Figure 7:
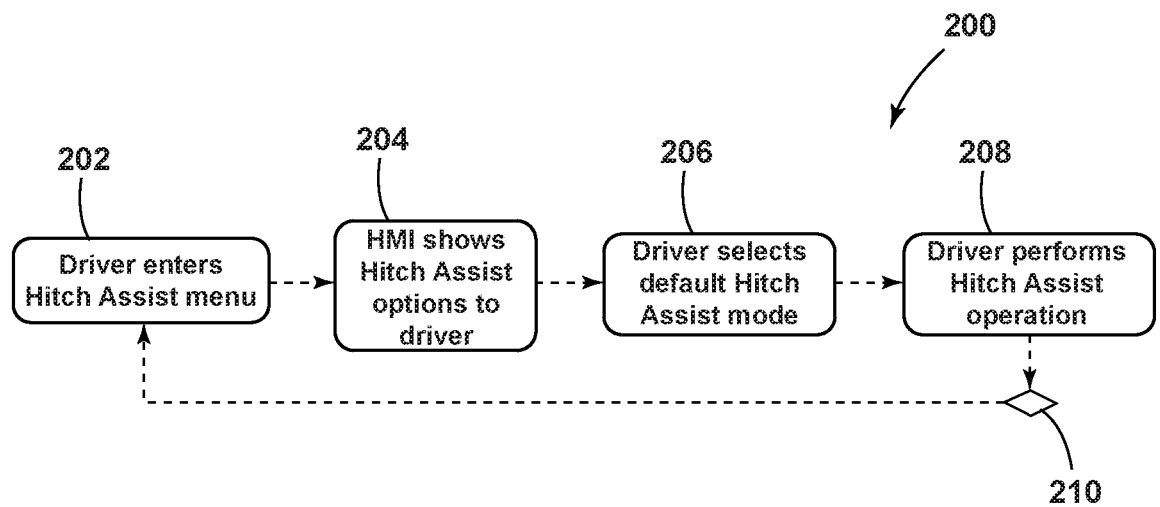
FIG. 7 is a flowchart depicting a sequence in presenting various alignment modes for selection by a user.
Figure 8:
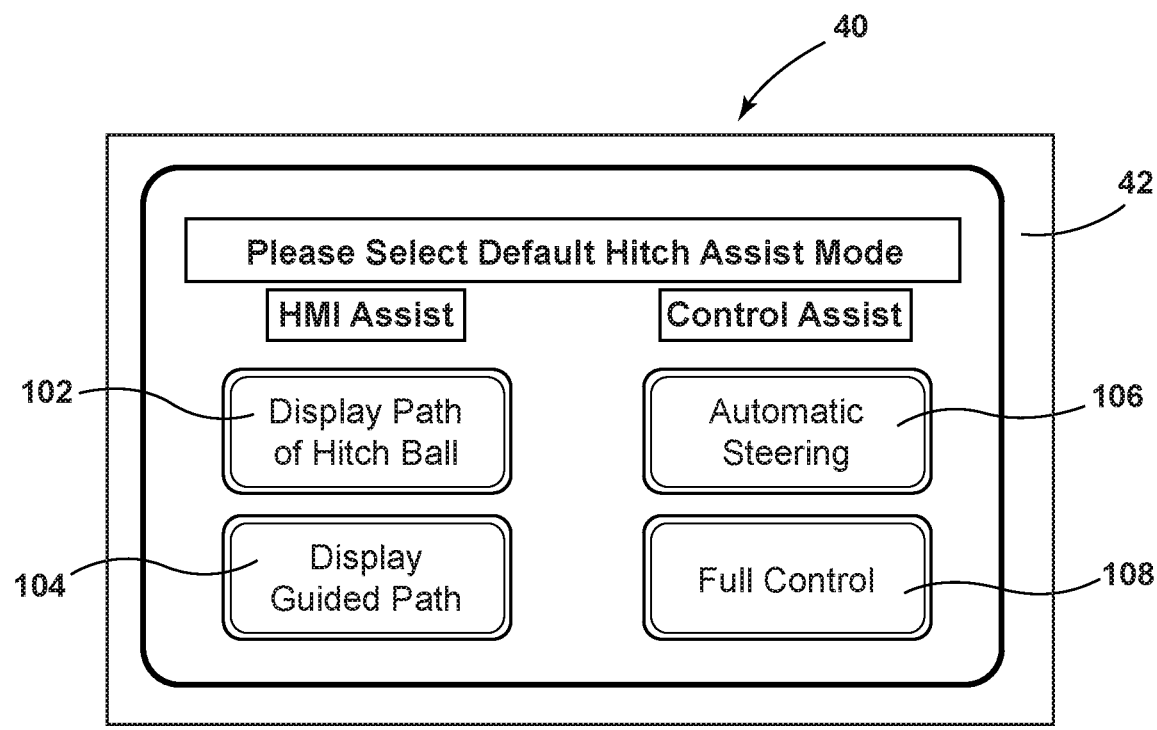
FIG. 8 is a depiction of a menu presentable to a user via a vehicle human-machine interface for selection of an alignment mode according to FIG. 7.

To address any of the above, or other similar potential, scenarios, system 10 may include additional functionality according to FIGS. 6-8. In one example, system 10 may be configured to additionally operate in a "basic" mode, where various vehicle paths are displayed on screen 42 as an overlay on the image data 55. As shown, the paths may include a vehicle path 92 that extends rearward of approximations of the rear corners of vehicle 12 and adjusts dynamically based on the steering angle δ detected by steering angle sensor 78. The paths may further include a hitch ball path 94 that extends generally from the center of the rear of vehicle 12 so as to align with the hitch ball 34 of vehicle 12 and to show a projected path of the hitch ball 34, given the detected steering angle δ. In addition, system 10 may also overlay a braking indication image 96 that can signal to the user when system 10 determines, such as by use of proximity sensors 54, that the coupler 14 is in a position relative to vehicle 12 to be at least longitudinally aligned with hitch ball 34. These paths 92, 94 are based on calculations regarding the steering angle δ and, therefore, are not susceptible to the visibility requirements discussed above for the various operating routines 64, 66, 68. Similarly, the proximity sensors 54 may be ultrasonic or the like and, accordingly, do not require any ambient light to function and may be less susceptible diminished functionality due to weather conditions. Further, the presentation of such paths 92, 94, and the braking image 98 on image 53 allows for continuing assessment and adjustment by the driver should wheel slip or diminished braking functionality result in hitch ball 34 not following path 94, exactly. Accordingly, such a "basic" mode may be available under all conditions, subject to an assessment by the user that the coupler 14 is visible to the user on display 42.

In an additional level of functionality, when coupler 14 can be identified by system 10, but steering system 20, braking system 70 and powertrain system 72 cannot be controlled with acceptable reliability, system may offer an "ideal" path 100 based on the user of the image processing 64 and path derivation 66 routines that can represent a path 32 determined by system 10 to align hitch ball 34 with coupler 14. When present, the user can adjust the steering input for vehicle 12 such that the hitch ball path 94 aligns with the ideal path 98 during reversing, while also controlling steering and braking until system 10 presents the braking indication 96 or the driver determines that appropriate longitudinal positioning has been achieved. Still further, system 10 may provide automatic steering of vehicle 12 by control of steering system 20 to maintain vehicle 12 along the determined path 32 while the user controls the operation of powertrain 72 and braking 70 system to control the speed of vehicle 12. This functionality can be used, for example, where visibility or ground conditions, for example allow for coupler 14 detection, but not ground tracking, or where powertrain 72 and/or brake system 70 cannot be controlled with the required accuracy, as discussed above. Finally, when the above-described conditions are met, the operability described above, including full control of vehicle 12 can be achieved.

System 10, when providing the various levels of functionality discussed above, can additionally operate according to the scheme 200 depicted in the flow chart of FIG. 7, wherein, upon activation 202 of system 10, the various hitch assist modes are presented 204 on the HMI 40 as selectable options respectively corresponding with the "basic" 102, "guided path" 104, automated steering 106, and full-control 108 modes discussed above. In one example, when presenting 202 such options, system 10 can first assess 204 availability of the various control modes, according to an assessment of the various characteristics discussed above, and can only present available options, or can display all options, with any unavailable options being indicated as un-selectable (such as by being dimmed, crossed out, greyed out, or the like). The system 10 can then receive 206 a mode selection from the user, which may be stored as a default mode or may be single-instance selection, before activating 208 the selected functionality according to the selected mode, which may remain the mode for subsequent operations until changed 210 by the user.

Figure 9:
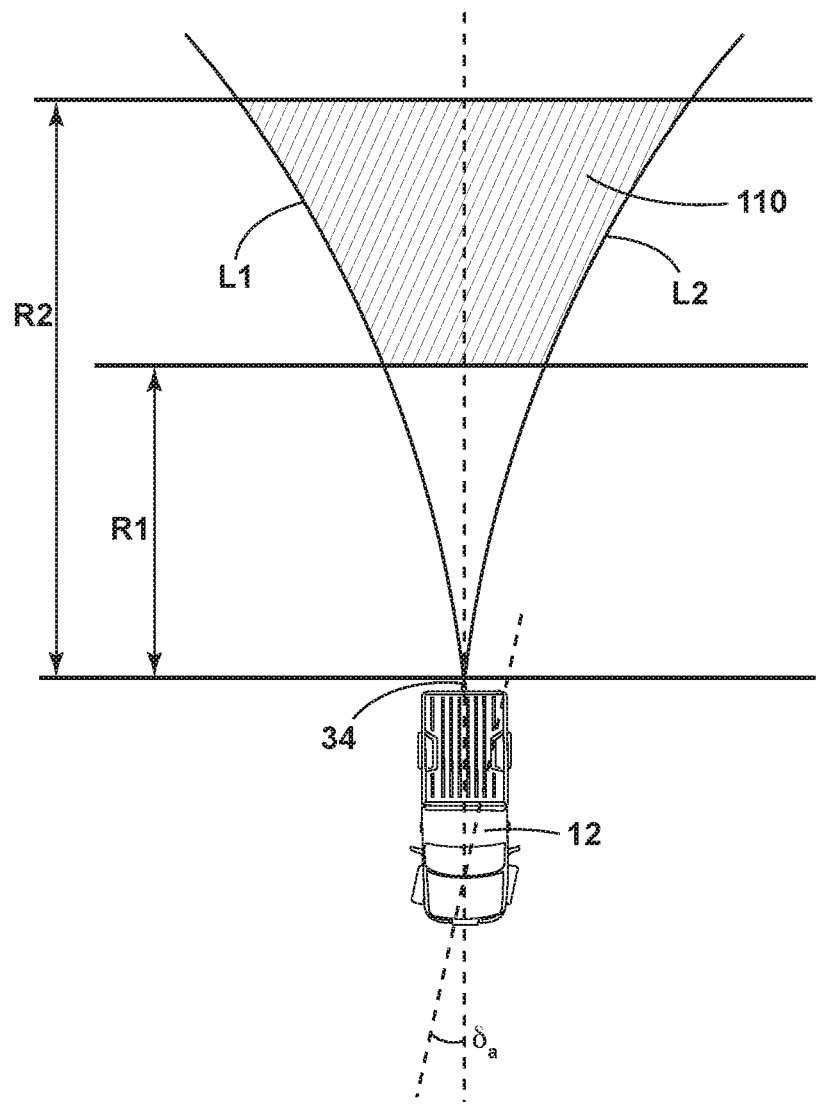
FIG. 9 is a schematic depiction of a valid zone for trailer identification based on alignment with a vehicle including a system according to FIG. 2.

Turning to FIGS. 9-17B various additional examples of executing the above-described full control hitch assist functionality by guiding the user to an initial vehicle 12 alignment with the subject trailer 16 in an initial acceptable zone are described. In one example, shown particularly in FIGS. 9-13, the target 45 may be displayed in a shape that more directly corresponds with the actual acceptable zone for trailer 16 and coupler 14 positioning relative to vehicle 12, which may provide increased flexibility and greater understanding of the system 10 requirements for the user compared to the generalized target of FIGS. 3 and 4. As discussed above, the visibility requirements of the operating routines 64,66,68 may dictate that trailer 16 (or at least coupler 14) be positioned between a longitudinal range between limits R1 and R2 that correspond with distance from the vehicle 12, as shown in FIG. 9. As also shown in FIG. 9, the lateral range for the acceptable zone extends between the lateral limits L1 and L2, which as discussed above extend outwardly from the hitch ball 34 along "maximum steerable" paths corresponding with a maximum or maximum allowed steering angle $\delta_{max}$ or $\delta_a$ in both the left and right directions. In this manner, the acceptable zone 110 is an area along the ground plane 30 that is within both the longitudinal range and the lateral range and is, therefore, an area bounded by respective portions of the longitudinal limits R1,R2 and the lateral limits L1,L2.

Figure 10:
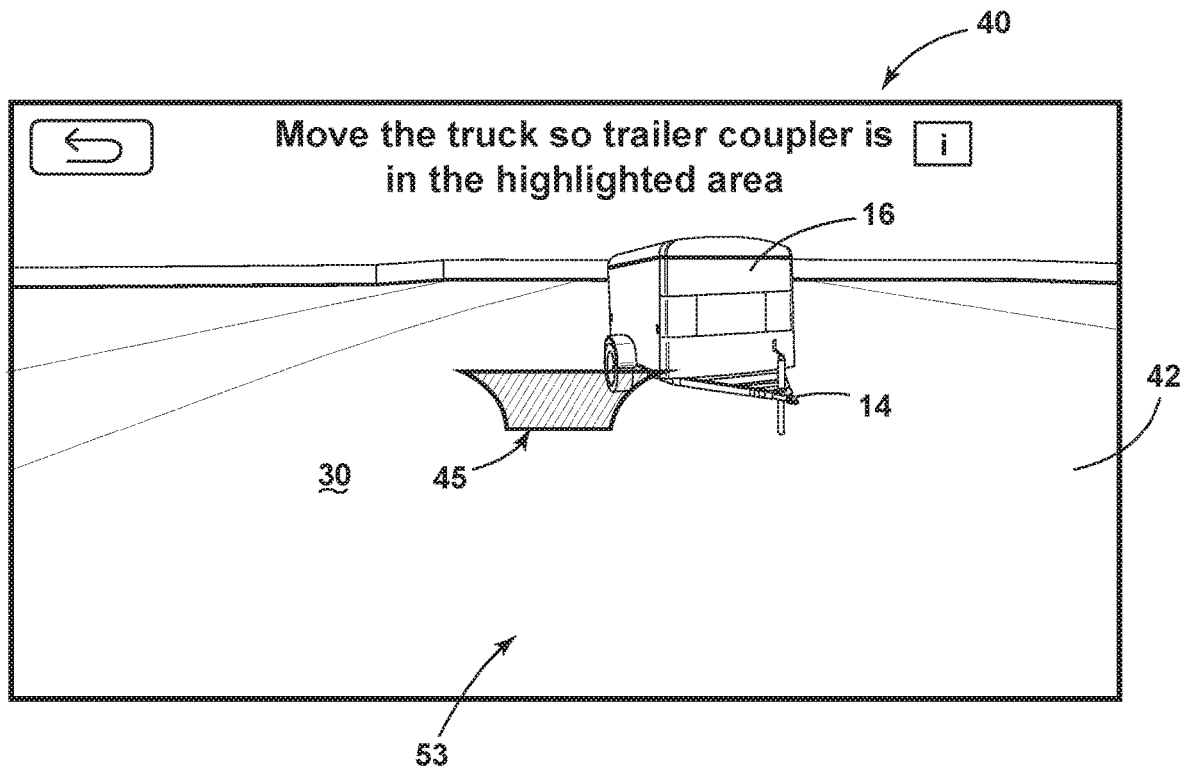
FIG. 10 is a depiction of an image received from a vehicle camera during an alternative alignment sequence step with an alternative target overlaid thereon.
Figure 11:
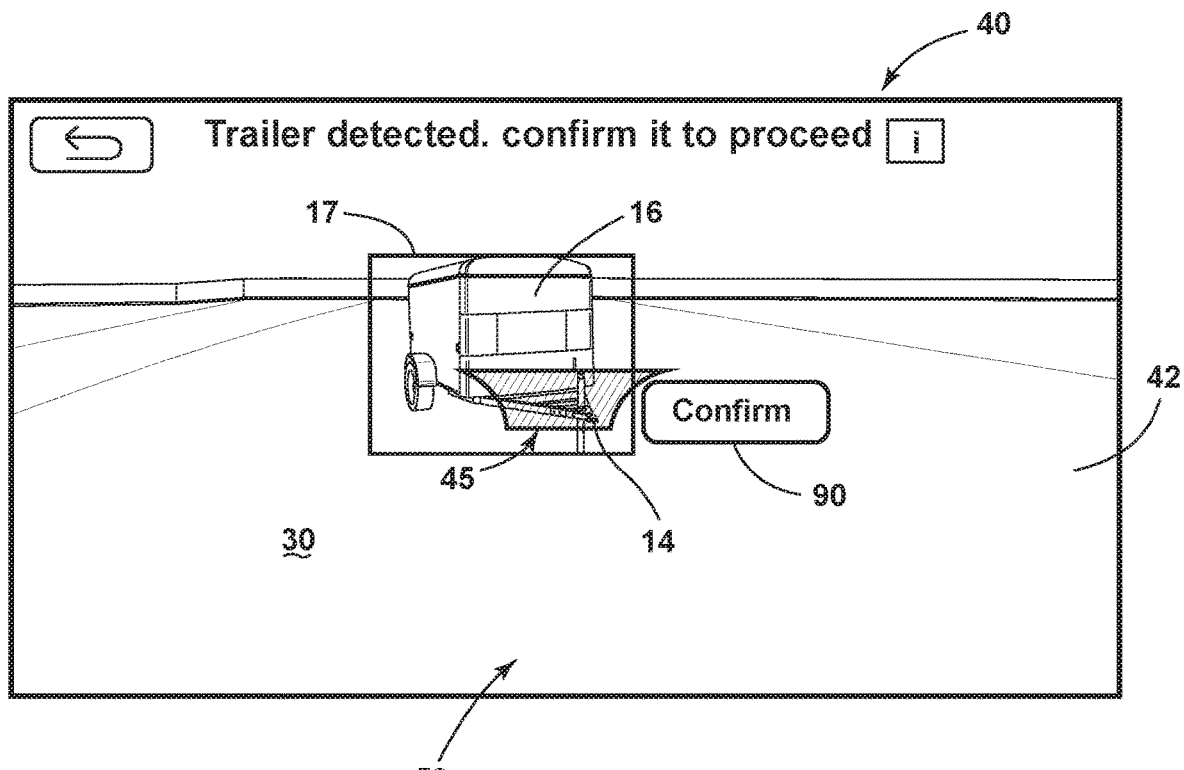
FIG. 11 is an further depiction of a subsequent image received from a vehicle camera during a subsequent alignment sequence step with the target and additional information overlaid thereon.
Figure 12:
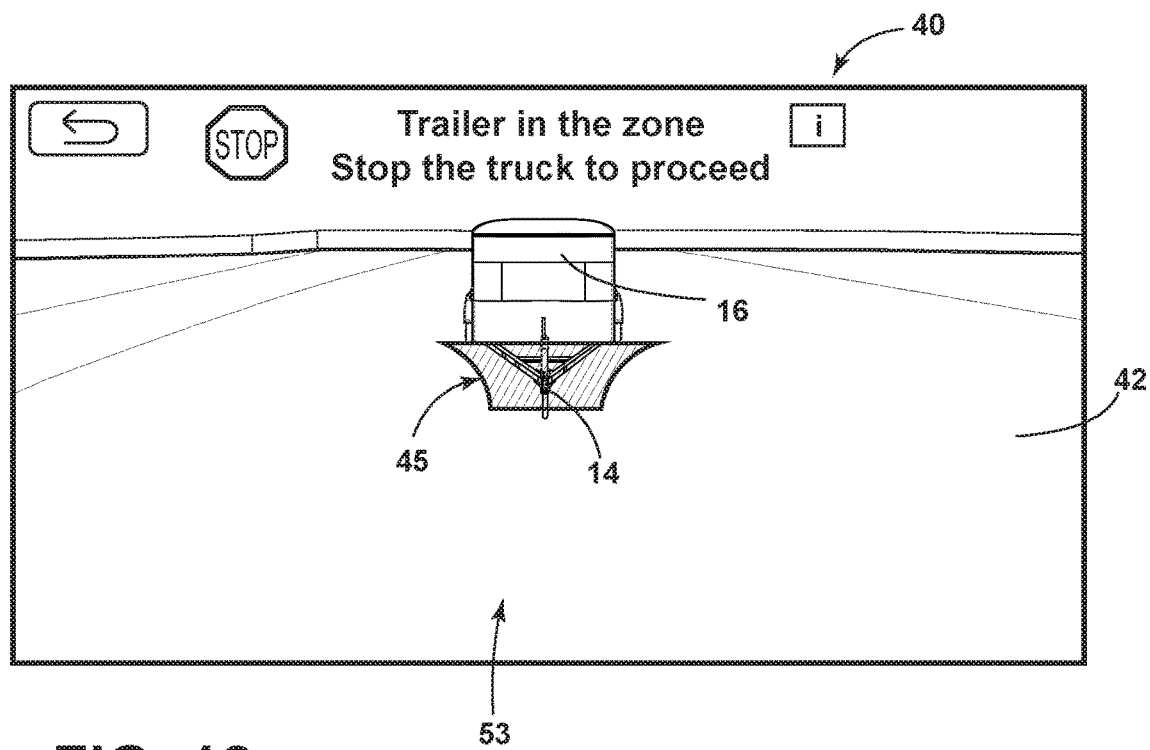
FIG. 12 is a depiction of an image received from a vehicle camera during an alternative alignment sequence step with an alternative target overlaid thereon.

As shown in FIG. 10, in an example, the target 45 can be presented on screen 42 as an overlay on the video image 53 displayed using the image data 55 that approximates the acceptable zone 110 on the image 53. In this manner, the respective portions of the ranges R1, R2, L1, L2 bounding the acceptable zone 110 can be graphically represented on screen 42 in a manner that correlates the acceptable zone 110 on the actual ground plane 30 with the view on the screen 42 based on the properties of camera 48, for example, and the position thereof to arrive at a perspective projection of the acceptable zone that at least reasonably appears as an area of the ground visible on the screen 42. In this manner, the user may position vehicle 12 such that the subject trailer is within the target 45 corresponding with the acceptable zone 110. In the example illustrated in FIG. 11, once such positioning is achieved and system 10 detects at least trailer 16 within the acceptable zone 110 or aligned with target 45, the indication 17 of trailer 16 identification can be overlaid on trailer 16 within image 53 and button 90 can be displayed for user confirmation of the intended trailer 16. In an alternative confirmation scheme, depicted in FIG. 12, system 10 can seek confirmation based on user action other than a touch on HMI 40. As shown, system 10 can present a prompt 108 on display 42 for the user to stop the vehicle 12 to initiate the hitching operation.

Figure 13:
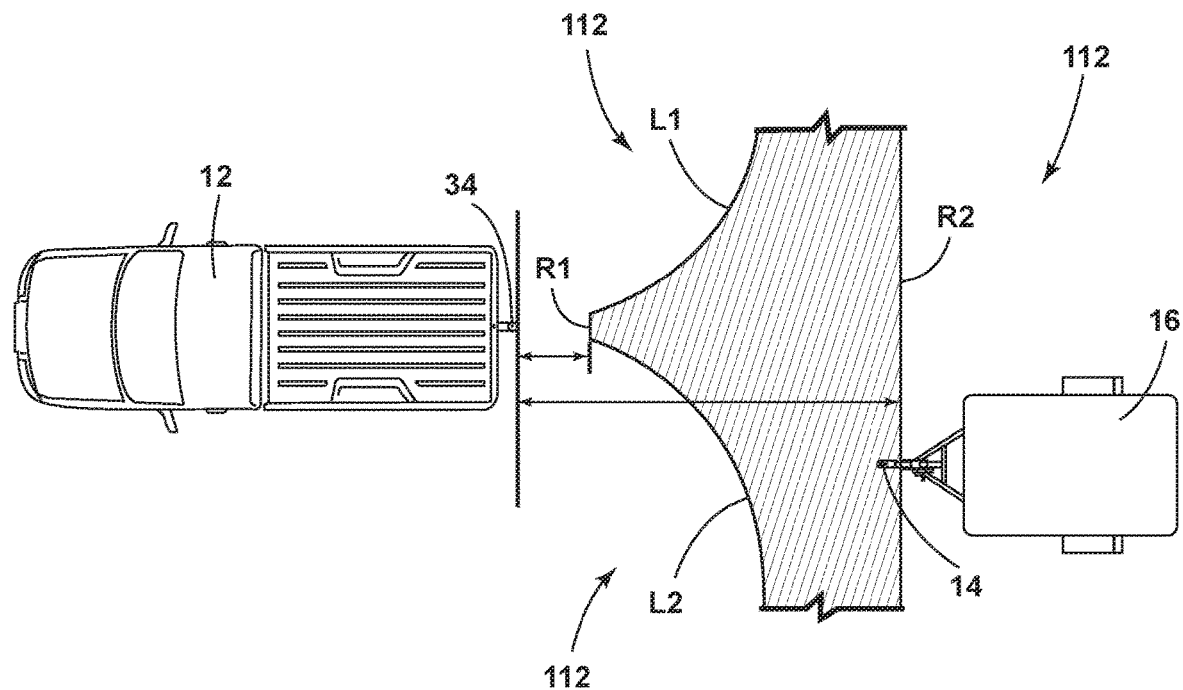
FIG. 13 is a schematic depiction of an alternative valid zone for trailer identification based on alignment with a vehicle including a system according to FIG. 2.
Figure 14:
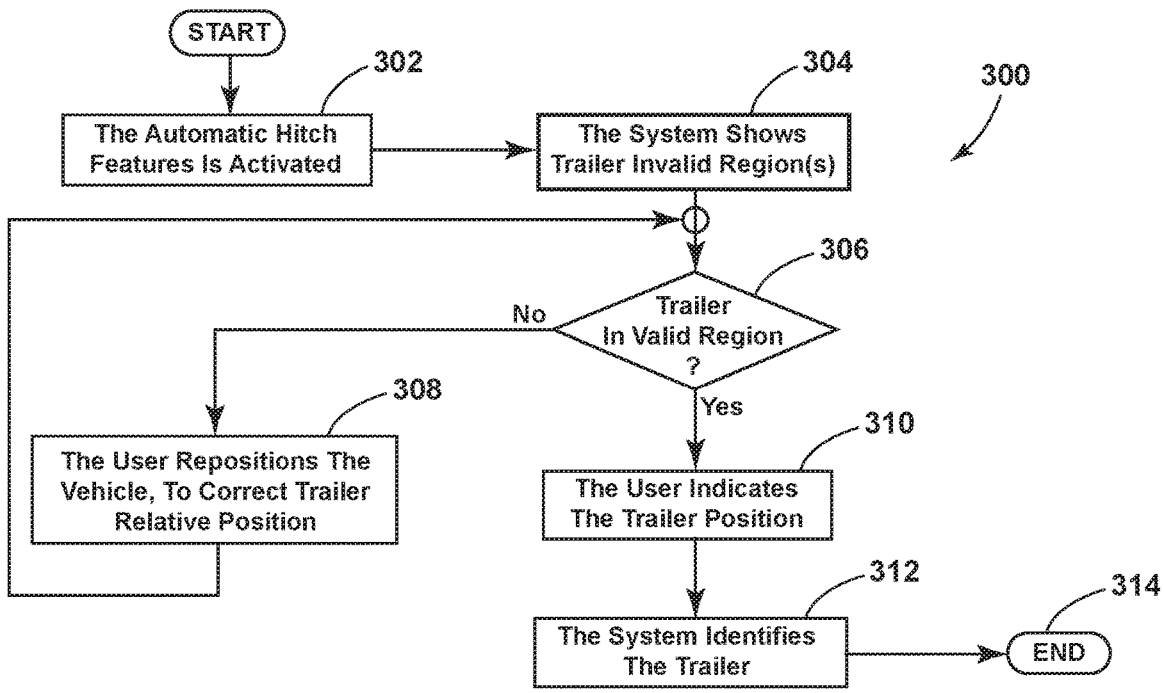
FIG. 14 is a flowchart depicting a sequence in guiding a vehicle into alignment with a trailer for identification thereof by a system according to FIG. 2.
Figure 15:
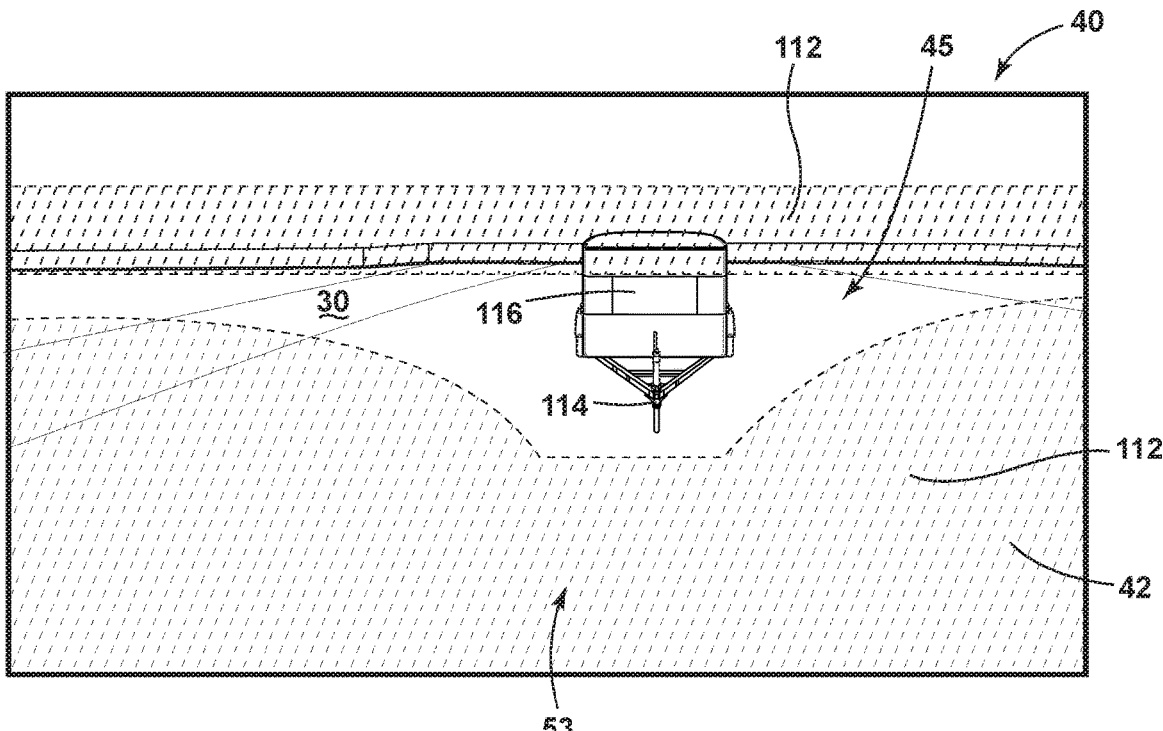
FIG. 15 is a depiction of an image received from a vehicle camera during the alignment sequence step of the sequence of FIG. 14 with an alternative target overlaid thereon.

As shown in FIGS. 13-17B positioning of vehicle 12 with trailer 16 positioned in the acceptable zone 110 can be "coached" by system 10 depicting the target 45 as, essentially, a void area within a depicted invalid zone 112 overlaid on image 53, as shown in FIG. 13. It is noted that the invalid zone 112 can simply be an inverse of the target 45 depicting the acceptable or "valid" zone 110, shown in FIGS. 10 and 12. For illustration purposes, the invalid zone 112 is depicted differently to illustrate the effect of varying system 10 constraints that can result in a larger valid zone 110, as shown in FIG. 14. In one aspect, system 10 can utilize the invalid zone 112 in a similar manner to the valid zone 110 target 45 discussed above with respect to FIGS. 9-12. In another example, system 10 can operate according to the scheme 300 depicted in FIG. 14, in which upon activation 302, system 10 causes the invalid zone 112 image to be presented 304 on display 42 as an overlay on the image 53 of the data 55 from camera 48, for example. The system 10 then relies on the user to assess 306 whether the trailer 16 is in a valid position (i.e. outside of the invalid zone 112) and to correct 308 the vehicle position, if needed. When the positioning is correct, the user can indicate 310 the trailer position by a touch input on screen 42, which the system 10 can use to narrow the field for image processing routine 64, which can then be used to identify 312 trailer 16 (and coupler 14 in an example) before ending the selection routine 314.

Figure 16:
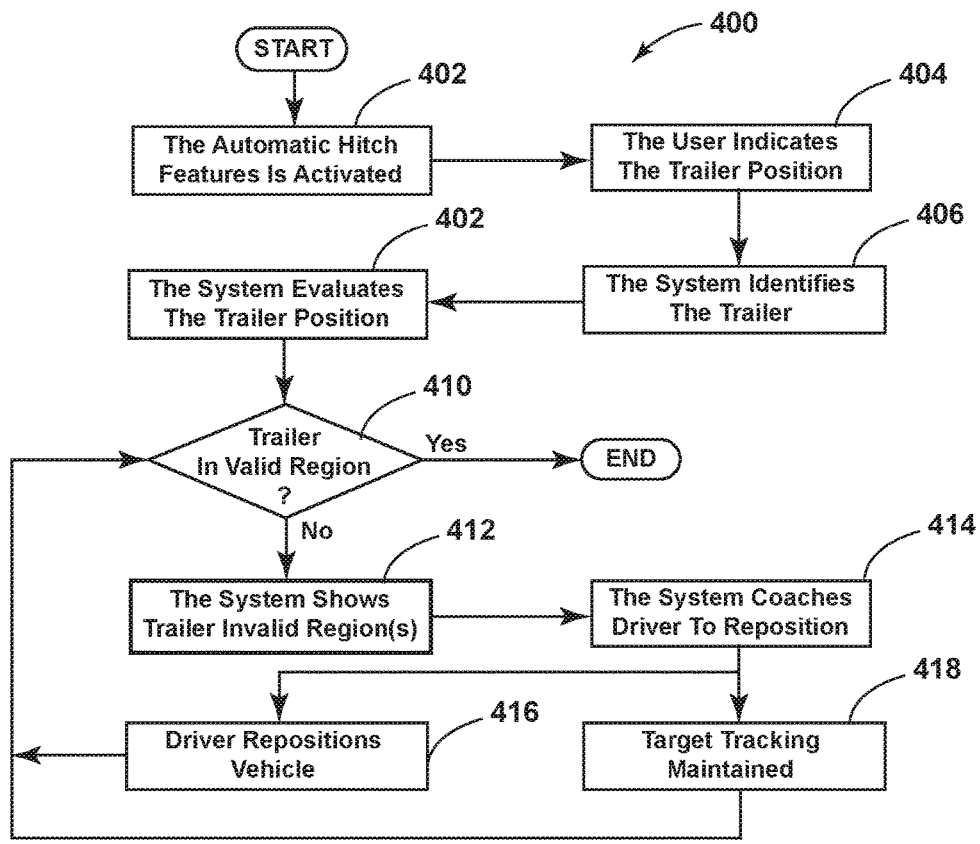
FIG. 16 is a flowchart depicting an alternative sequence in guiding a vehicle into alignment with a trailer for identification thereof by a system according to FIG. 2.
Figures 17A, 17B:
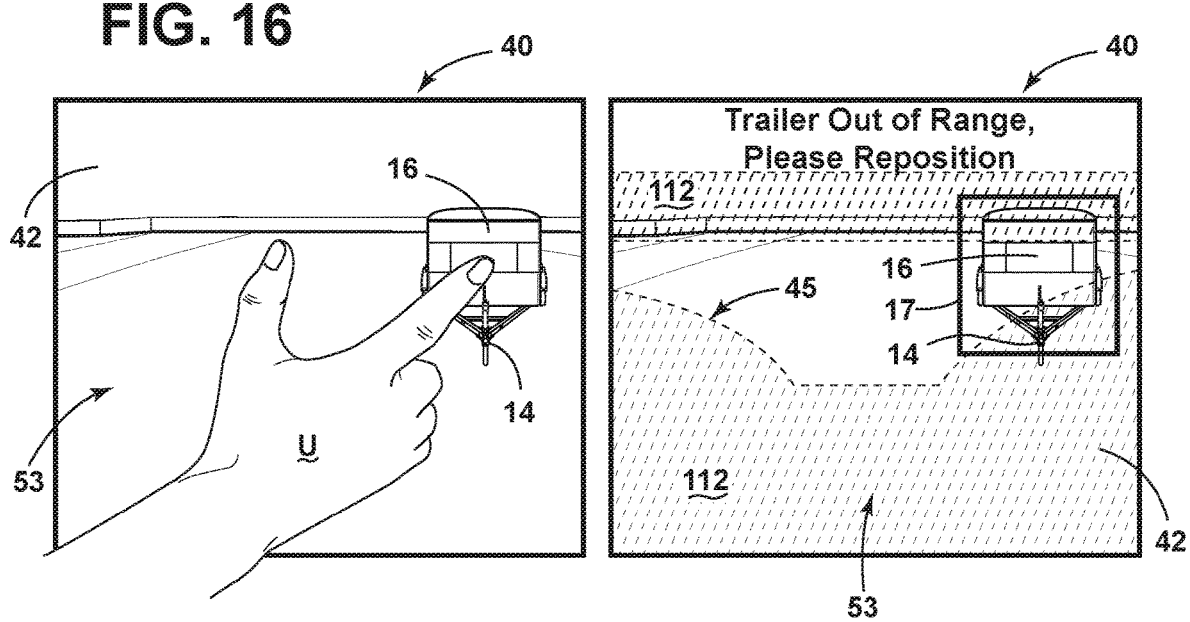
FIGS. 17A and 17B are depictions of respective image received from a vehicle camera during alignment sequence steps of the sequence of FIG. 16.

In another example, system 10 can operate by the scheme 400 of FIG. 16, wherein, upon activation 402, system 10 waits for a user indication 402 of the trailer 16 position via a touch input on screen 42 (as shown in FIG. 17A). If possible, the system 10 can identify 406 the trailer 16 using image processing routine 64 in connection with the touch input. If the trailer 16 is identified, system 10 can analyze 408 the trailer 16 position and can determine 410 whether trailer 16 is in the valid zone 110. If the trailer 16 is not in the valid zone 110 (or cannot be identified, indicating, potentially, that the trailer is outside of the longitudinal range), system 10 can then present 412 the invalid zone and instruct 414 the driver to reposition 416 the vehicle 12 accordingly, while maintaining 418 the tracking of the trailer 16 (if detected) until trailer 16 is in the valid zone 110. When trailer 16 is identified within the target zone 110, system 10 can end the identification scheme and can proceed to the available guidance operation, as discussed above.

Figure 18:
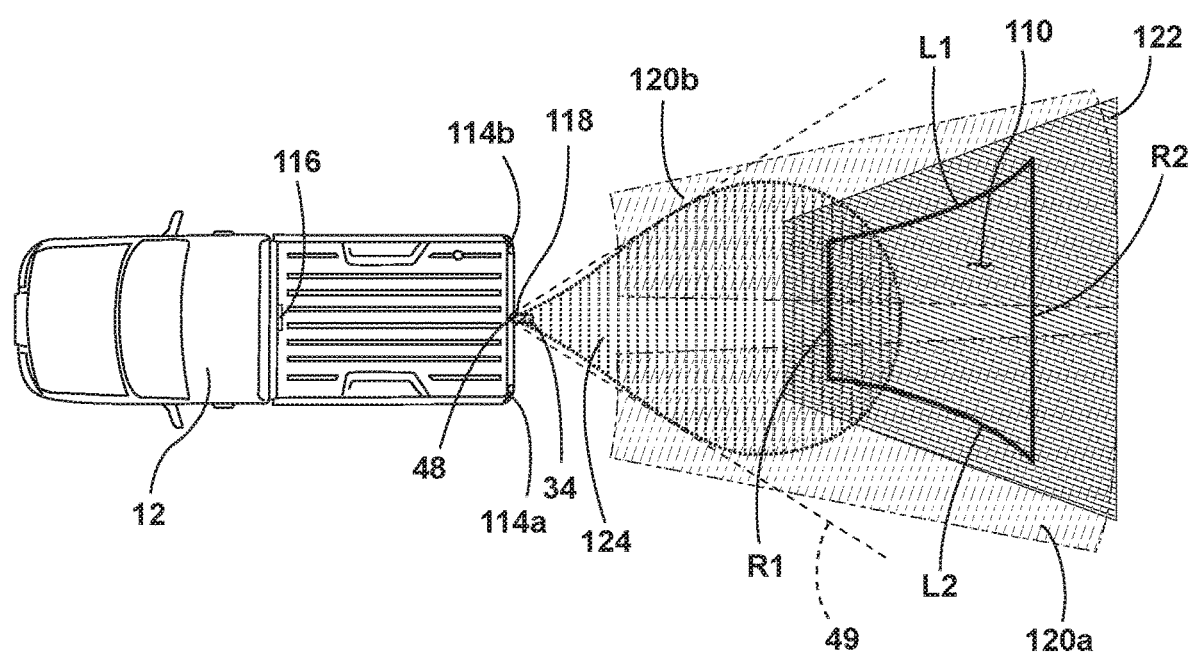
FIG. 18 is an overhead schematic view of portions to the rear of a vehicle illuminated by various exterior lights included on the vehicle.
Figure 19:
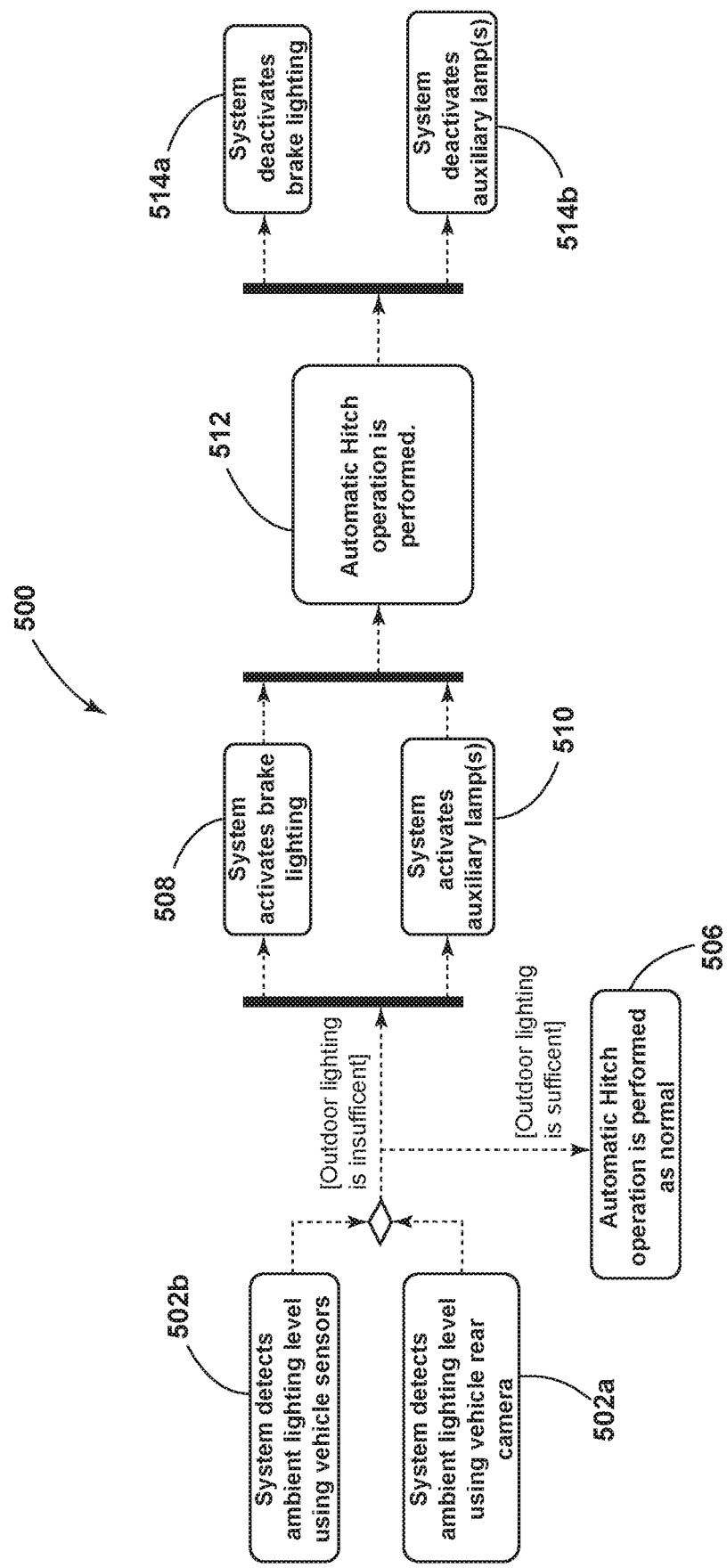
FIG. 19 is a flowchart depicting a sequence of selectively using exterior vehicle lights to improve the ability of a system according to FIG. 2 to detect a trailer.

As shown in FIG. 18, system 10 may utilize the various exterior lights on and/or directed away from the rear of vehicle 12 to illuminate the area behind vehicle 12 to improve the ability of system 10 to locate and track trailer 16 and coupler 14 during the operation of at least the image processing routine 64 and operating routine 68. As illustrated, such lights may include the right 114a and left 114b brake lights, the center high-mount stop light ("CMHSL") 116, and the tailgate light 118, and may vary in the particular arrangement and lights included, depending on the vehicle 12 configuration. In this manner, more or fewer lights may be present with vehicle 12, for example, potentially further including backup lights, taillights, etc. In the illustrated example, system 10, upon activation can illuminate the depicted right 114a and left 114b brake lights, CMHSL 116, and the tailgate light 118, regardless of detected conditions or may analyze the image data 55 to determine the lighting conditions or to make an initial assessment regarding potential impact of weather conditions on the ability to identify one or more trailers 16 within the field of view 49 of camera 48, for example. Such illumination can be initiated by system 10 by way of communication with the vehicle lighting control system or functionality. As shown in FIG. 19, in one implementation, system 10 may operate 500 by a process including initially detecting the ambient lighting level, either using the camera 48 (for example) or using other vehicle sensors (steps 502a or 502b). System 10 can then determine 504 whether the available lighting is sufficient and proceed 506 with the automated hitching operation (as discussed above) or may activate 508,510 the available exterior lighting before performing 512 the hitching operation with the additional lighting and deactivating 514a,514b the exterior lighting (or allowing it to return to an initial state) when the operation is complete.

The additional illumination provided by the illustrated lights 114a, 114b, 116, 118 may facilitate the identification by system 10 of any trailers 16 within the field of view 49 of camera 48, for example, by improving the contrast and/or resolution of the image data 55 available to system 10, particularly in the area where the illumination of such lights overlaps. As shown in FIG. 18, in some vehicle 12 and lighting configurations, the area where the illumination areas 120a, 120b, 122, 124 (of lights 114a, 114b, 116, 118, respectively) overlap may wholly or partially coincide with all or part of the acceptable zone 110, thereby providing the ability of system 10 to reliably utilize the target 45 discussed above for vehicle 12 and trailer 16 alignment in an increase range of ambient conditions, including those with low ambient light, and the like. In this manner, the acceptable zone 110 and resulting target configuration 45 may dynamically adjust in size or configuration (particularly with respect to the longitudinal range limits R1, R2) depending on the available light and/or the use of the exterior lighting during image processing routine 64. In another example, target 45 can be sized and configured based on limits R1, R2 during low-light conditions augmented by exterior light illumination to more reliably ensure system 10 reliability without requiring prior condition detection.

Figure 20:
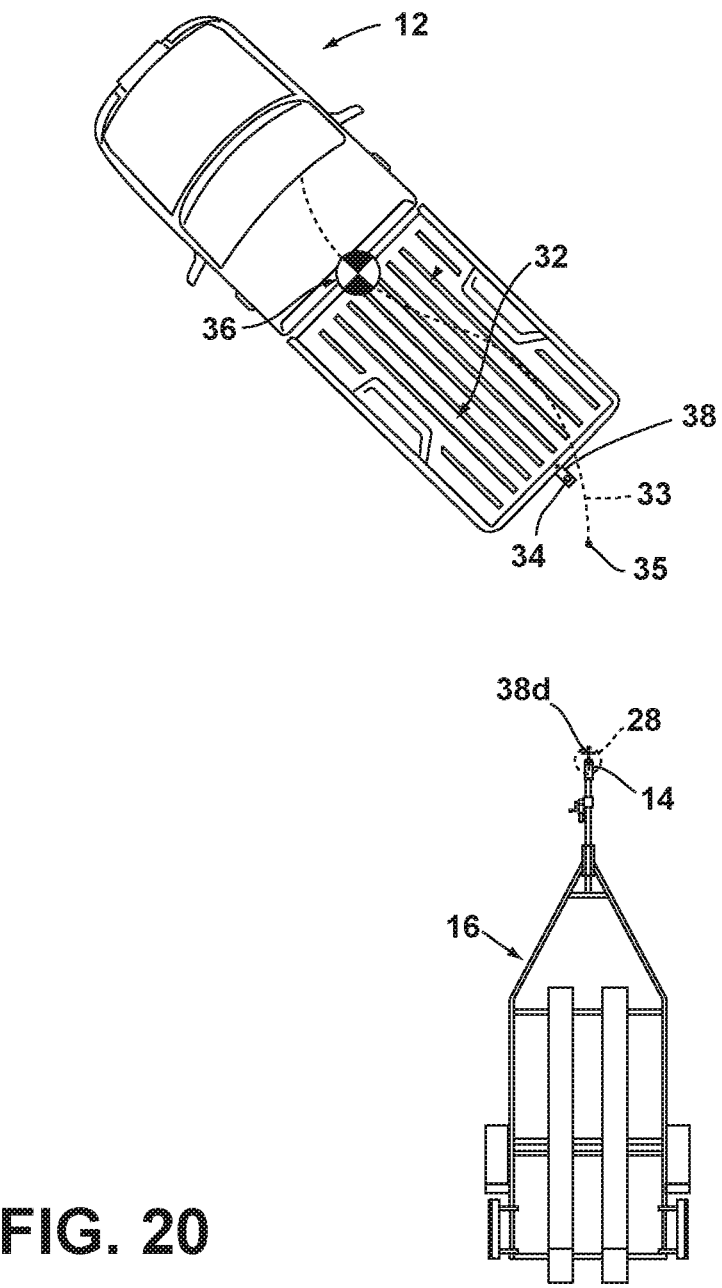
FIG. 20 is an overhead schematic view of the vehicle during a subsequent step of the alignment sequence with the trailer.
Figure 21:
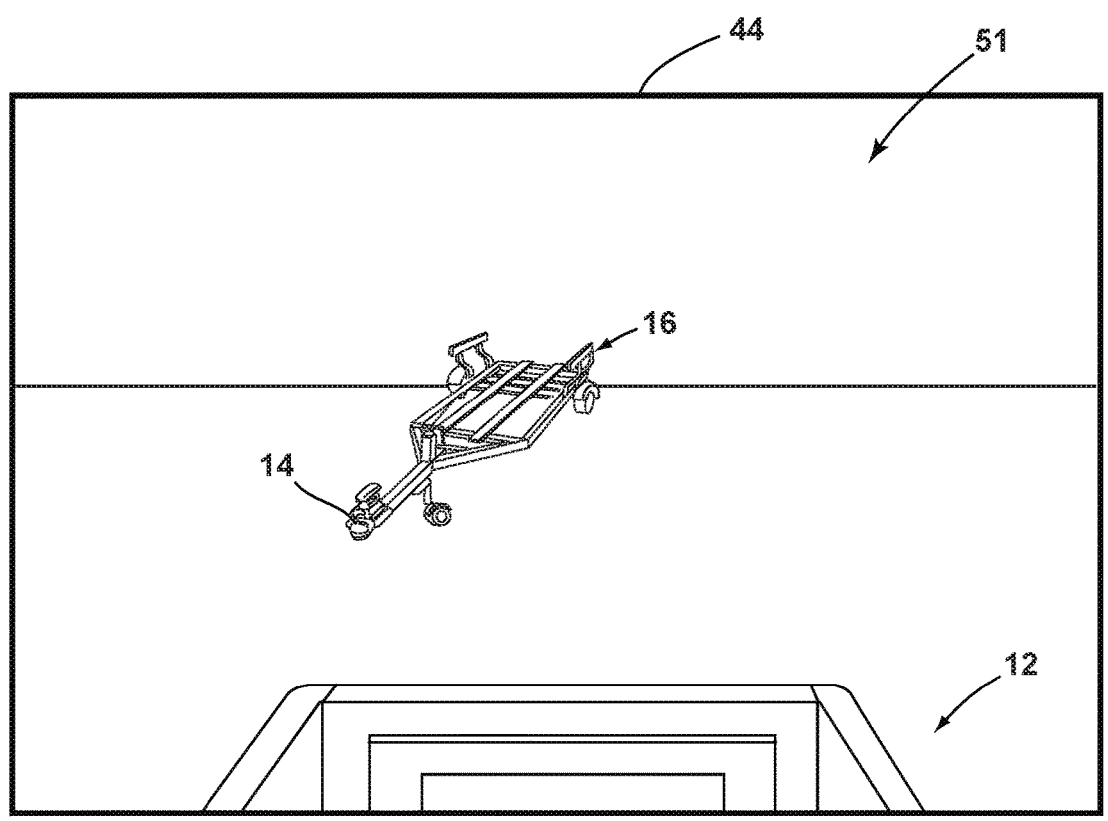
FIG. 21 is a depiction of an image received from a vehicle camera during the alignment sequence step of FIG. 7.
Figure 22:
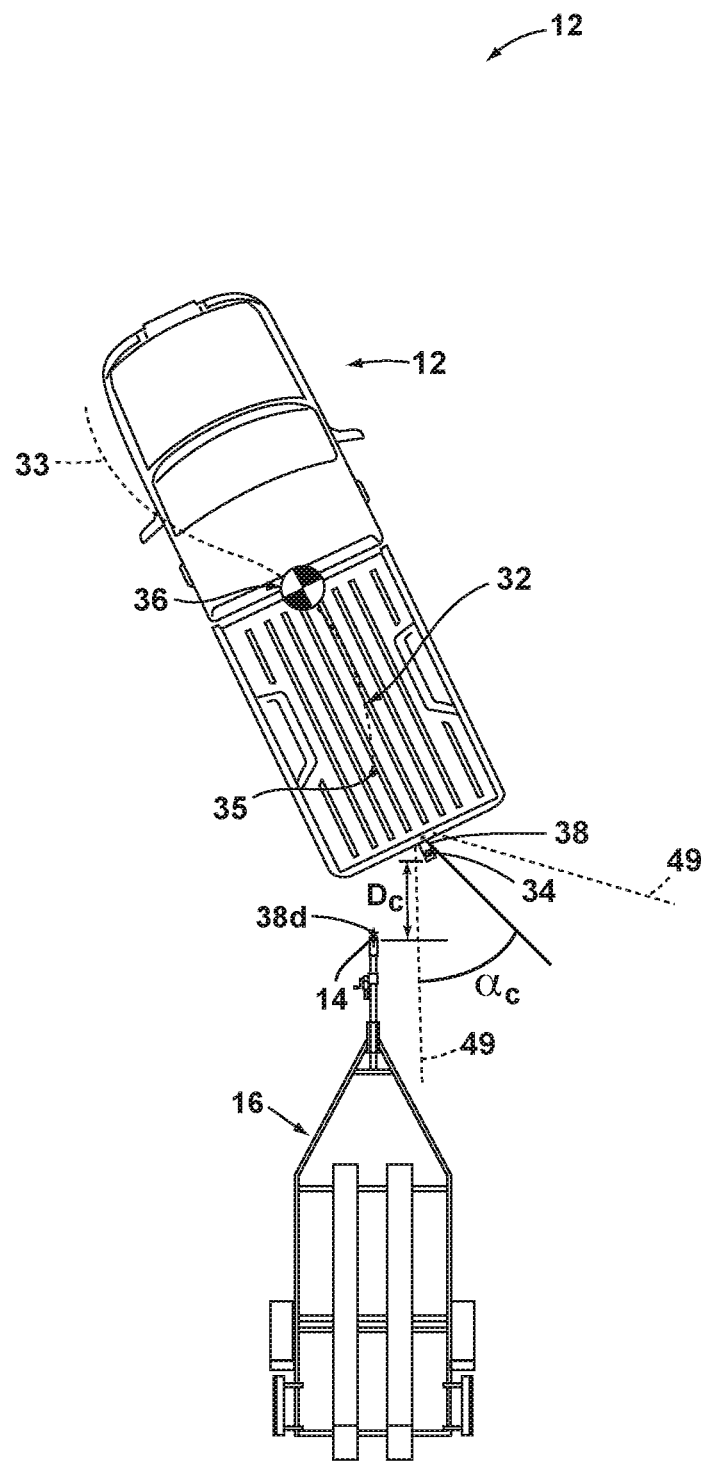
FIG. 22 is an overhead schematic view of the vehicle during a subsequent step of the alignment sequence with the trailer.
Figure 23:
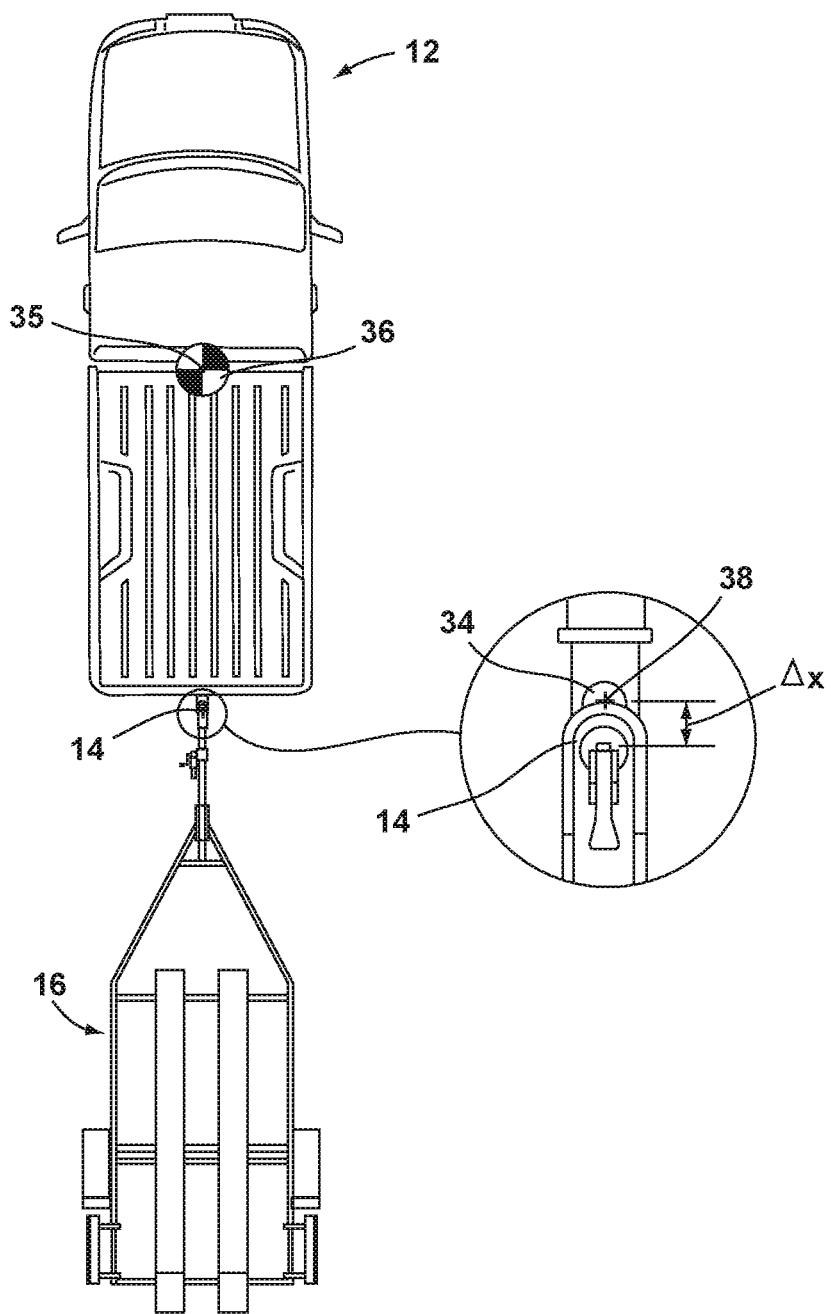
FIG. 23 is an overhead schematic view of the vehicle during a subsequent step of the alignment sequence with the trailer and showing the position of a hitch ball of the vehicle at an end of a derived alignment path.

Turning now to FIGS. 20-23, once the trailer 16 and coupler 14 have been identified, and system 10 determines the path 32 to align hitch ball 34 with the coupler 14, the operating routine 68 may continue to guide vehicle 12 until hitch ball 34 is in the desired position $38_d$ relative to coupler 14 for coupler 14 to engage with hitch ball 34 when coupler 14 is lowered into horizontal alignment therewith. In the example discussed above, image processing routine 64 continuously monitors the positioning $D_c$, $α_c$ of coupler 14, constantly or once available, during execution of operating routine 68, including as coupler 14 comes into clearer view of rear camera 48, as shown in FIG. 21, with continued movement of vehicle 12 along path 32, as shown in FIG. 20. As discussed above, the position of vehicle 12 can also be monitored by dead reckoning device 24 with the position 28 of coupler 14 being continuously updated and fed into path derivation routine 66 in case path 32 and or endpoint 35 can be refined or should be updated (due to, for example, improved height $H_c$, distance $D_c$, or offset angle $α_c$ information due to closer resolution or additional image data 55), including as vehicle moves closer to trailer 16, as shown in FIG. 22. Still further, the coupler 14 can be assumed to be static such that the position of vehicle 12 can be tracked by continuing to track the coupler 14 to remove the need for use of the dead reckoning device 24. In a similar manner, a modified variation of operating routine 68 can progress through a predetermined sequence of maneuvers involving steering of vehicle 12 at or below a maximum steering angle $δ_{max}$, while tracking the position $D_c$, $α_c$ of coupler 14 to converge the known relative position of hitch ball 34 to the desired position 38d thereof relative to the tracked position 28 of coupler 14, as discussed above and shown in FIG. 23.

Figure 24:
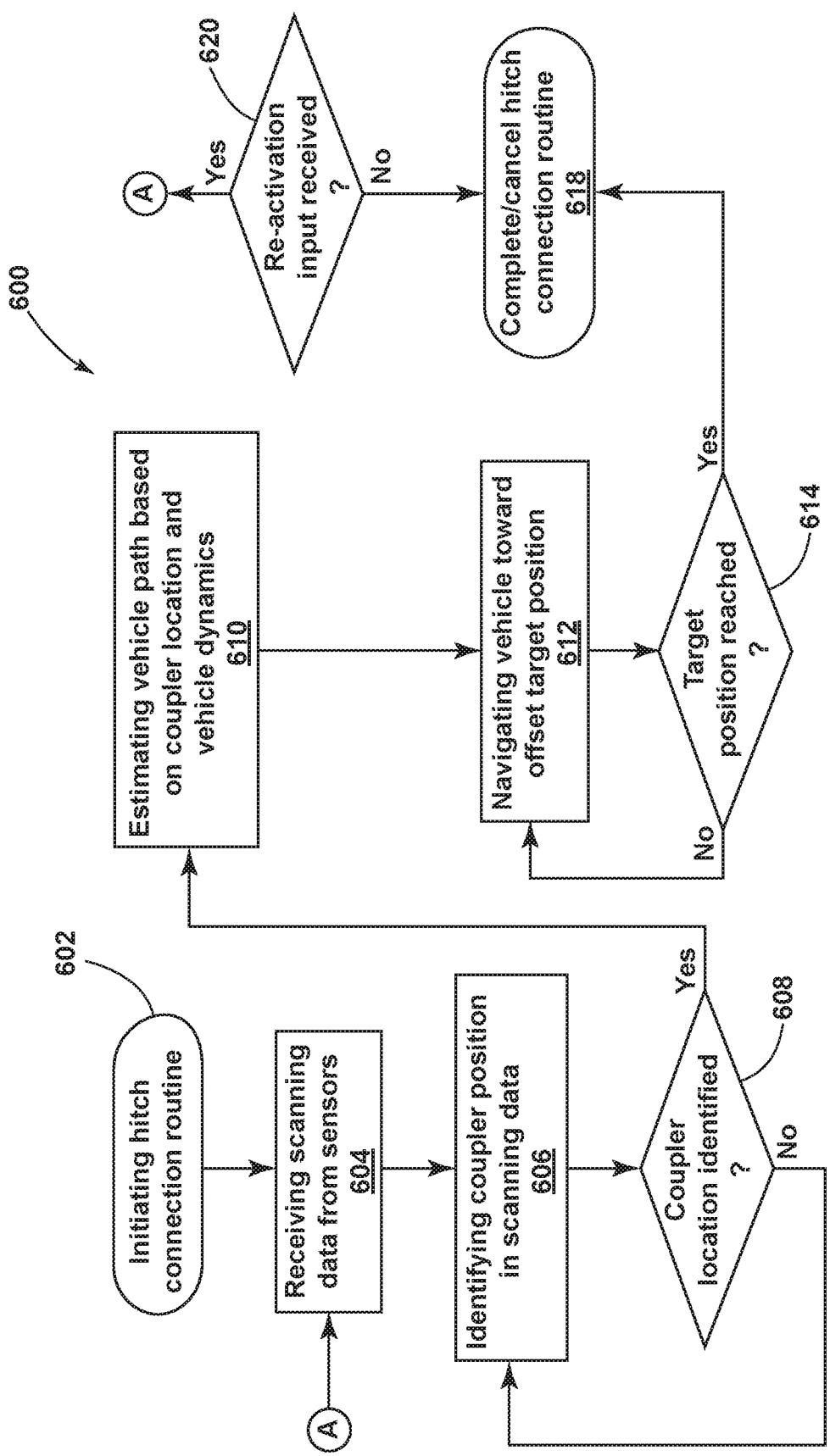
FIG. 24 is a flowchart depicting steps in the alignment sequence.

Turning now to FIG. 24, a flowchart showing steps in one operating scheme 600 for using hitch assist system 10 to align a vehicle hitch ball 34 with a trailer coupler 14 is shown. In particular, in step 602, the hitch assist system 10 is initiated. Once the hitch assist system 10 is initiated 602, controller 26 can use imaging system 18 to scan the viewable scene using any or all available cameras 48, 50, 52a, 52b (step 604). The scene scan (step 612) can be used to then identify 606 the trailer 16 and coupler 14, which may be confirmed by the user, which may proceed using target 45 on vehicle HMI 40, as discussed in any of the schemes discussed above.

If the coupler 14 can be identified (step 608) in the image data 55, the height $H_c$, distance $D_c$, and offset angle $α_c$ of coupler 14, as identified in step 606, can then be determined using the available image data 55 (step 606) as discussed above, including using image processing routine 64. As discussed above, image processing routine 64 can be programmed or otherwise configured to identify coupler 14 of trailer 16 within image data 55 (step 606). In this manner, after the results of the initial scene scan (step 604) are analyzed, controller 26 can determine if coupler 14 has been confirmed by the user (such as by way of HMI 40). If coupler 14 has not been confirmed or if a determined coupler 14 has been rejected, the scene scan (step 604) can be continued, including while instructing driver to move vehicle 12 to better align with trailer 16, including by positioning the trailer 16 and/or coupler 14 within any of the above-descried targets 45, until coupler 14 is identified.

When coupler 14 has been identified and confirmed, the path derivation routine 66 can be used to determine the vehicle path 32 to align hitch ball 34 with coupler 14 in step 610. In this manner, the positioning $D_h$, $β_h$ of coupler 14 is extracted from the image data 55 and used to place the coupler 14 within the stored data relating the image coordinates with the real-world coordinates of the area surrounding vehicle 12. In doing so, controller 26 uses path derivation routine 66 to determine path 32 to align hitch ball 34 with the predicted position 28 of coupler 14 to an engaging position over hitch ball 34, as described above with respect to FIGS. 20-23.

Once the path 32 has been derived, hitch assist system 10 can ask the user U to relinquish control of at least the steering wheel of vehicle 12 (and, optionally, the throttle 73 and brake, in the implementation of hitch assist system 10 described above wherein controller 26 assumes control of powertrain control system 72 and brake control system 70 during execution of operating routine 68). When it has been confirmed that user U is not attempting to control steering system 20 (for example, using torque sensor 80, as discussed above), controller 26 begins to move vehicle 12 along the determined path 32. Hitch assist system 10 then controls steering system 20 (step 612) to maintain vehicle 12 along path 32 as either user U or controller 26 controls the velocity of vehicle 12 using powertrain control system 72 and braking control system 70. As discussed above, controller 26 or the user can control at least steering system 20, while tracking the position $D_c$, $α_c$ of coupler 14 until vehicle 12 reaches endpoint 35 (step 614), wherein the vehicle 12 hitch ball 34 reaches the desired position $38_d$ for the desired alignment with coupler 14, at which point operating routine 68 can end (step 618), either by controlling brake system 70 to cause vehicle 12 to stop (which can be done progressively as vehicle 12 approaches such a point), or by issuing a command to the user to stop vehicle 12 (which can also be done progressively or by a countdown as vehicle 12 approaches the desired location) before deactivating hitch assist system 10. Vehicle 12 can then be driven normally with system 10 remains idle until a reactivation input 620 is received, at which point the above-described method restarts at the scanning step 604.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle hitching assistance system, comprising:
a controller:
acquiring image data from the vehicle;
executing an initial alignment process, including:
illuminating one or more exterior lights directed toward a rear of the vehicle prior to acquiring the image data from the vehicle;

searching for a trailer, positioned past a minimum distance from the vehicle, within a specified area of the image data, the specified area being less than a total field of the image data in directions corresponding with both a longitudinal distance between the vehicle and the trailer and a lateral direction perpendicular to the longitudinal distance; and presenting an indication to a driver of the vehicle to reposition the vehicle when the trailer is not identified within the specified area and removing the indication when the trailer is identified within the specified area, the trailer remaining past the minimum distance from the vehicle; and executing an automated backing process upon identifying the trailer within the specified area, including identifying a coupler of the trailer and outputting a steering signal to the vehicle to cause the vehicle to steer to align a hitch ball of the vehicle with the coupler of the trailer during reversing of the vehicle toward the trailer.

2. The system of claim 1, wherein the controller acquires the image data from an imaging system included with the vehicle, the imaging system having at least one camera, the total field of the image data corresponding with a total field of view of the at least one camera.

3. The system of claim 2, wherein: the controller outputs the steering signal to a steering system included with the vehicle; and the controller derives the steering signal based on at least a maximum steering angle of the steering system.

4. The system of claim 1, wherein the specified area of the image data is a circular target area disposed within a central portion of the image data.

5. The system of claim 1, wherein the specified area of the image data is within a designated boundary comprising respective portions based on a resolution of the image data, a proportion of the trailer relative to the total field, and a known steering limit of the vehicle.

6. The system of claim 5, wherein the respective portions of the designated boundary are based on a correlation of the total field of the image data with an area of an assumed ground plane on which the vehicle is positioned visible within the total field.

7. The system of claim 6, wherein the area of the assumed ground plane includes:
a maximum coupler detection distance corresponding with the resolution of the image data;
a minimum trailer identification distance corresponding with the proportion of the trailer relative to the total field; and left and right maximum steerable paths extending from the vehicle in a reversing direction corresponding with the known steering limit of the vehicle.

8. The system of claim 1, wherein, during the initial alignment process, the controller further outputs a video image displayable on a human-machine interface within the vehicle including:
the image data;
a graphic overlay of the specified area on the image data in a proportionally correlated manner; and
a message indicating to the driver of the vehicle to reposition the vehicle until the trailer is identified within the specified area.

9. The system of claim 8, wherein the controller begins executing the initial alignment process, including outputting the graphic overlay and message in the video image, upon activation of the system.

10. The system of claim 9, wherein, during the initial alignment process, the controller:

receives an input from the human-machine interface corresponding with a user indication of a trailer within the image data; and
outputs the graphic overlay and message in the video image only after receiving the user indication of the trailer within the image data and failing to identify any trailer within the specified area of the image data.

11. The system of claim 1, wherein the controller: during the initial alignment process, identifies the trailer within the specified area of the image data and determines if a sensing condition and a visibility condition are met;
executes the automated backing process, including identifying the coupler of the trailer and outputting the steering signal to the vehicle to cause the vehicle to steer to align the hitch ball of the vehicle with the coupler as a part of a first hitch assist mode when the sensing condition and visibility condition are not met;
further implements a second hitch assistance mode when one of the sensing condition and the visibility condition are not met, the second hitch assistance mode including presenting an image of a best fit path to align the hitch ball with the coupler to the user for guiding user control of the vehicle in reversing the vehicle toward the trailer;
receives a selection signal from the vehicle corresponding with a user selection of a mode before implementing either the first or second hitch assistance mode; and
causes the vehicle to present an indication that the first hitch assist mode may not be selected when one of the sensing condition and the visibility condition are not met.

12. A vehicle, comprising:
a steering system;
at least one exterior light mounted on and directed away from a rear of the vehicle; and
a controller:
acquiring image data from the vehicle;
executing an initial alignment process, including:
illuminating the at least one exterior lights directed toward a rear of the vehicle prior to acquiring the image data from the vehicle;
searching for a trailer, positioned at a distance from the vehicle, within a specified area of the image data, the specified area being less than a total field of the image data in directions corresponding with both a longitudinal distance between the vehicle and the trailer and a lateral direction perpendicular to the longitudinal distance, the specified area further being located within an area to the rear of the vehicle illuminated by the at least one exterior light;
presenting an indication to a driver of the vehicle to reposition the vehicle when the trailer is not identified within the specified area and removing the indication when the trailer is identified within the specified area; and
executing an automated backing process only upon identifying the trailer within the specified area, including outputting a steering signal to the vehicle steering system to align a hitch ball of the vehicle with a coupler of the trailer during reversing of the vehicle toward the trailer.

13. The vehicle of claim 12, wherein after identifying the trailer within a specified area of the image data, the controller identifies the coupler of the trailer during execution of the automated backing process.

14. The vehicle of claim 12, wherein the specified area of the image data is within a designated boundary comprising respective portions based on a resolution of the image data, a proportion of the trailer relative to the total field, and a known steering limit of the vehicle.

15. The vehicle of claim 14, wherein the respective portions of the designated boundary are based on a correlation of the total field of the image data with an area of an assumed ground plane on which the vehicle is positioned visible within the total field.

16. The vehicle of claim 14, wherein illumination of the at least one exterior light facilitates identifying the trailer within the image data.

17. The vehicle of claim 12, wherein the at least one exterior light includes at least one of a left brake light, a right brake light, a tailgate light, and a center high-mount stop light mounted on respective portions of an exterior of the vehicle.

18. A method for assisting a vehicle in hitching with a trailer, comprising:
 acquiring image data for a field of view away from a rear of the vehicle;
 executing an initial alignment process, including:
  illuminating one or more exterior lights directed toward a rear of the vehicle prior to acquiring the image data from the vehicle;
  searching for a trailer, past a minimum distance from the vehicle, within a specified area less than the field of view of the image data, the specified area being less than a total field of the image data in directions corresponding with both a longitudinal distance between the vehicle and the trailer and a lateral direction perpendicular to the longitudinal distance; and
 presenting an indication to a driver of the vehicle to reposition the vehicle when the trailer is not identified within the specified area and removing the indication when the trailer is identified within the specified area, the trailer remaining past the minimum distance from the vehicle; and
 executing an automated backing process upon identifying the trailer within the specified area, including identifying a coupler of the trailer and outputting a steering signal to cause the vehicle to steer to an align a hitch ball of the vehicle with the coupler during reversing of the vehicle toward the trailer.

19. The vehicle of claim 12, wherein the controller further indicates to a driver of the vehicle to reposition the vehicle until the trailer is identified within the specified area.

* * * * *